US009315710B2

(12) United States Patent
Abhari

(10) Patent No.: US 9,315,710 B2
(45) Date of Patent: Apr. 19, 2016

(54) PLASTIC PHASE CHANGE MATERIAL AND ARTICLES MADE THEREFROM

(71) Applicant: REG SYNTHETIC FUELS, LLC, Ames, IA (US)

(72) Inventor: Ramin Abhari, Bixby, OK (US)

(73) Assignee: REG SYNTHETIC FUELS, LLC, Ames, IA (US)

( * ) Notice: Subject to any disclaimer, the term of this patent is extended or adjusted under 35 U.S.C. 154(b) by 0 days.

(21) Appl. No.: 13/839,770

(22) Filed: Mar. 15, 2013

(65) Prior Publication Data

US 2013/0228308 A1 Sep. 5, 2013

(51) Int. Cl.

| | |
|---|---|
| C09K 5/06 | (2006.01) |
| F28D 20/02 | (2006.01) |
| B29B 9/12 | (2006.01) |
| C08J 3/00 | (2006.01) |
| F28D 19/02 | (2006.01) |
| F28D 19/04 | (2006.01) |
| B29B 9/06 | (2006.01) |
| C08L 23/04 | (2006.01) |

(52) U.S. Cl.
CPC . *C09K 5/063* (2013.01); *B29B 9/12* (2013.01); *C08J 3/005* (2013.01); *F28D 19/02* (2013.01); *F28D 19/042* (2013.01); *F28D 20/023* (2013.01); *B29B 9/065* (2013.01); *C08J 2323/06* (2013.01); *C08J 2491/06* (2013.01); *C08L 23/04* (2013.01); *F24F 2203/10* (2013.01)

(58) Field of Classification Search
None
See application file for complete search history.

(56) References Cited

U.S. PATENT DOCUMENTS

| | | | |
|---|---|---|---|
| 4,547,536 A | 10/1985 | Nabors | |
| 4,908,166 A * | 3/1990 | Salyer | 264/470 |
| 4,992,605 A | 2/1991 | Craig et al. | |
| 5,053,446 A | 10/1991 | Salyer | |
| 6,238,732 B1 * | 5/2001 | Cameron et al. | 427/208.2 |
| 6,793,856 B2 | 9/2004 | Hartmann et al. | |
| 7,524,379 B2 | 4/2009 | Bailey et al. | |

(Continued)

FOREIGN PATENT DOCUMENTS

SG    172045    11/2012

OTHER PUBLICATIONS

Beare-Rogers, J. et al, "Lexicon of Lipid Nutrition," Pure and Applied Chemistry, vol. 73, No. 4, 2001, pp. 685-744.

(Continued)

*Primary Examiner* — Necholus Ogden, Jr.
(74) *Attorney, Agent, or Firm* — Foley & Lardner LLP; James P. McParland; Joseph P. Meara

(57) ABSTRACT

The present invention generally relates to a method for manufacturing phase change material (PCM) pellets. The method includes providing a melt composition, including paraffin and a polymer. The paraffin has a melt point of between about 10° C. and about 50° C., and more preferably between about 18° C. and about 28° C. In one embodiment, the melt composition includes various additives, such as a flame retardant. The method further includes forming the melt composition into PCM pellets. The method further may include the step of cooling the melt to increase the melt viscosity before pelletizing. Further, PCM compounds are provided having an organic PCM and a polymer. Methods are provided to convert the PCM compounds into various form-stable PCMs. A method of coating the PCMs is included to provide PCMs with substantially no paraffin seepage and with ignition resistance properties.

55 Claims, 13 Drawing Sheets

(56) References Cited

U.S. PATENT DOCUMENTS

| | | | |
|---|---|---|---|
| 7,563,398 | B2 | 7/2009 | Hartmann et al. |
| 8,231,804 | B2 | 7/2012 | Abhari |
| 8,329,078 | B2 | 12/2012 | Gueret et al. |
| 2002/0105108 | A1 | 8/2002 | Hartmann et al. |
| 2005/0035482 | A1 | 2/2005 | Hartmann et al. |
| 2006/0124892 | A1 | 6/2006 | Rolland et al. |
| 2008/0312480 | A1 | 12/2008 | Dindi et al. |
| 2010/0151535 | A1 | 6/2010 | Franklin et al. |
| 2010/0196641 | A1 | 8/2010 | De Vos et al. |
| 2011/0169179 | A1* | 7/2011 | Gueret et al. ............. 264/6 |
| 2011/0224299 | A1 | 9/2011 | McNamara et al. |

OTHER PUBLICATIONS

Catalysts in Petroleum Refining & Petrochemicals Program Listing, 16th Saudi-Japanese Symposium, http://www3.kfupm.edu.sa/catsymp/Symp 16th/Program.htm, accessed Sep. 9, 2013.

Connor, et al., "Hydrogenolysis of Oxygenated Organic Compounds," J. Am. Chem. Soc., 54(12), 1932, pp. 4678-4690.

Craig, et al., "A Marketing Survey of Worldwide Potential for Use of Vegetable Oil Conversion Products in Diesel Fuel," Saskatchewan Research Council, Oct. 1989 (182 pages).

Final Office Action in U.S. Appl. No. 13/223,122 dtd Aug. 14, 2013 (13 pages).

Food Fats and Oils, Inst. of Shortening and Edible Oils, 335-354 (9th Ed. 2006).

Gosselink, et al., "Mild Hydrotracking: Coping with Catalyst Deactivation," 34 Catalyst Deactivation, 279-287 (1987).

Gusmao et al., "Utilization of Vegetable Oils as an Alternative Source for Diesel-Type Fuel," Catalysis Today, 5, 1989, pp. 533-544.

Iki, et al., "Applicability of Hydrogenated Palm Oil for Automotive Fuels", 16th Saudi Arabia-Japen Joint Symposium, Dhahran, Saudi Arabia, Nov. 5-6, 2006, 10 pages.

Kubicka, et al., "Transformation of Plant Oils to Hydrocarbons," APROCHEM 2007, 1149-1155, Apr. 16-18, 2007.

n-dodecane Compound Summary, PubChem, National Center for Biotechnology Info., http://pubchem.ncbi.nlm.nih.gov/summary/summary.cgi?cid=8182#x27.

Non-Final Office Action in U.S. Appl. No. 13/223,122 dtd May 24, 2013 (13 pages).

n-tetradecane Compound Summary, PubChem, National Center for Biotechnology Info., http://pubchem.ncbi.nlm.nih.gov/summary/summary.cgi?cid=12389#x27.

Simacek, et al., "Hydroprocessed rapeseed oil as a source of hydrocarbon-based biodiesel", Fuel 88, 2009, 456-460.

Smejkal, et al., "Thermodynamic balance in reaction system of total vegetable oil hydrogenation", Chemical Engineering Journal 146 (2009) 155-160.

Smejkal, et al., Bibliographic Data for: "Thermodynamic balance in reaction system of total vegetable oil hydrogenation", Chemical Engineering Journal 146 (2009) 155-160.

Song, et al., Temperature Programmed Retention Indices for GC and GC-MS of Hydrocarbon Fuels and Simulated Distillation GC of Heavy Oils, Analytical Advances for Hydrocarbon Research, 147-210, 2003.

Standard Methods for the Analysis of Oils, Fats and Derivatives, 6th Ed., Part 1, pp. 96-108 (Pergamon Press 1979).

U.S. Appl. No. 12/331,906, filed Dec. 10, 2008(now U.S. Pat. No. 8,231,804).

Non-Final Office Action in U.S. Appl. No. 13/223,122 dtd Mar. 19, 2014 (13 pages).

"Crosslinking," Encyclopedia of Polymer Science and Technology, vol. 4, 1966, pp. 331-414.

"Ethylene Polymers," Encyclopedia of Polymer Science and Technology, vol. 6, 1967, pp. 275-331.

ASTM D1238-85, "Standard Test Method for Flow Rates of Thermoplastics by Extrusion Plastometer," ASTM International, 1985, pp. 1-13.

ASTM D2765-95, "Standard Test Methods for Determination of Gel Content and Swell Ratio of Crosslinked Ethylene Plastics," ASTM International, 1996, pp. 1-7.

Billmeyer, F.W., Textbook of Polymer Science, Third Ed., 1984, pp. v, 40-43.

Sharma, B.K., "Plastics," Industrial Chemistry (Including Chemical Engineering), 2013, p. 879.

Final Office Action in U.S. Appl. No. 13/223,122 dtd Nov. 25, 2014 (10 pages).

Notice of Allowance in U.S. Appl. No. 13/223,122 dated May 21, 2015 (8 pages).

* cited by examiner

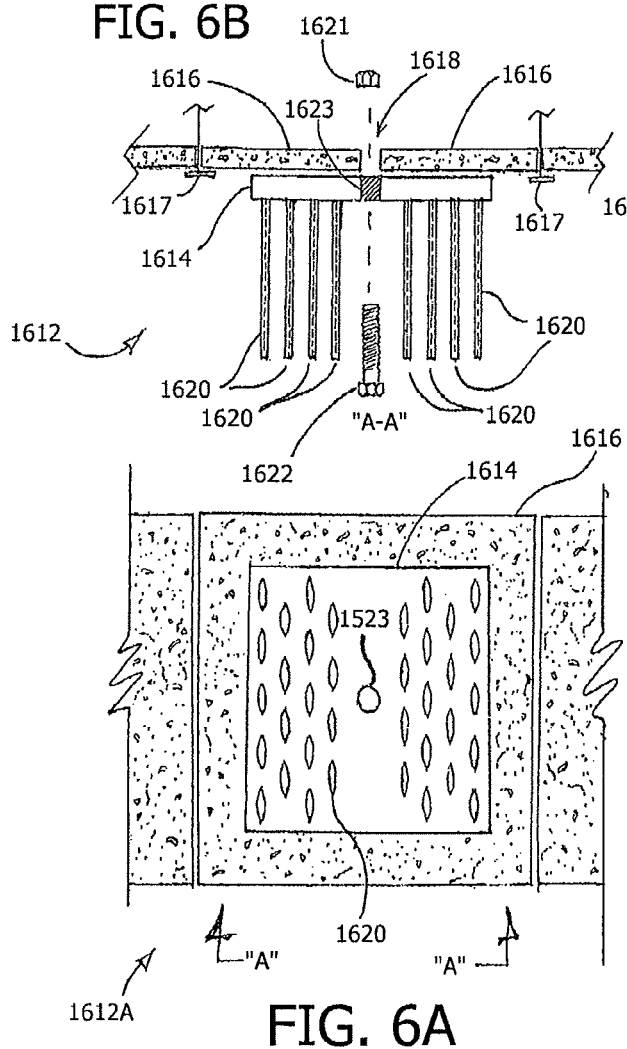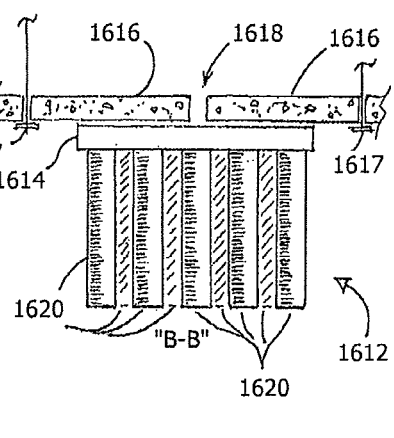
FIG. 6B
FIG. 6C
FIG. 6A

PLASTIC PHASE CHANGE MATERIAL AND ARTICLES MADE THEREFROM

STATEMENT REGARDING FEDERALLY SPONSORED RESEARCH OR DEVELOPMENT

Some aspects of this disclosure were made with U.S. government support under DE-EE0003924 awarded by the U.S. Department of Energy. The U.S. government may have certain rights in the disclosure.

BACKGROUND

Globally, the single largest source of $CO_2$ emissions is power generation. In the U.S., electric power accounts for 38% of $CO_2$ emissions, followed by transportation at 33%. It is estimated that about 20% of the U.S. electric power generation is for air conditioning.

The primary use of air conditioning is cooling. Air conditioning drives the peak electrical load during warm months.

Every electric grid is supplied by three types of power plants for meeting the changing power demand during the day. These power plants (or modes of operation) are referred to as base load, intermediate load, and peak load. Base load is the electricity that is continuously supplied to the grid— whether it is used or not. When most residences and commercial buildings have their lights off, people are in bed, TVs and computers are in "off" or "hibernate" mode, base load electricity generators run in the background at a constant generating capacity. Power plants that supply base load electricity to the grid are typically among the most efficient due to their steady mode of operation. These include hydroelectric and nuclear power plants.

Around 6 a.m., as people wake up and work restarts in offices, stores, and factories, the intermediate load generators start supplying power to the grid in response to the daytime demand. Intermediate load power plants include mainly fossil fuel fired boilers and turbines. However, these also include renewable power sources such as wind and solar that, due to their intermittent nature, cannot be relied upon for base load.

Later in a typical warm day, as temperatures rise and air conditioning units need to stay on to keep work and home environments at a comfortable temperature range, additional generators need to come online to meet this added demand. In the U.S., the peak load generators are mainly natural gas fired. Many other countries rely on diesel generators to meet peak electricity demand. Peak demand in summer time is in late morning and the afternoon. The winter peak is generally a lower load value and is reached later in the day (mainly for evening space heating, primetime TV viewing, running laundry and dishwashers, etc.). Base, intermittent, and peak operations, make up about 50-60%, 20-30%, and 20-30% of total daily electrical generation capacity, respectively. Base and intermediate power are also referred to as "off-peak" electricity.

Based on the preceding overview, it is clear that the effects of $CO_2$ emissions from combustion of fossil fuels can be mitigated by reducing the peak cooling demand for air conditioners during warm days. Phase Change Material (PCM) having a solid-liquid phase transition (i.e., melting and freezing) temperature of 21-26° C. (70-79° F.) and relatively high latent heats of phase transition (>60 J/g), have been proposed as thermal storage devices that can effectively shift the peak load energy requirements to base load power generating periods when capacity typically exceeds demand.

For example, as described in the prior art, PCM can be incorporated into wall boards and ceiling tiles of a room. As the daily temperature rises, the PCM starts to melt. The temperature of the PCM remains essentially unchanged while it is melting, maintaining the indoor temperature in the comfort range of 21-26° C. without need for peak load air conditioning. Once all the PCM has melted, the room temperature rises, the air conditioner starts, and the PCM starts to refreeze using off-peak (i.e., base load) electricity.

One can look at the shifting of electrical demand from peak to base load in terms of storing heat or cold. The PCM latent heat is its effective thermal energy storage capacity. When a PCM, which is liquid at outside daytime temperature, is frozen at nighttime using off-peak air conditioning, it becomes a cold storage device. This cold is recovered the next day (as the PCM undergoes phase change) to help keep the inside temperature at the comfortable range without use of peak load air conditioning. Here, the PCM acts as a natural thermostat, much like ice cubes maintain the temperature of a beverage constant at around 0° C. while melting therein.

The Coefficient of Performance (COP) for an air conditioning unit is given by Equation 1, where $T_{amb}$ and $T_{cold}$ are the ambient and cooled media temperatures, respectively.

$$COP = T_{cold}/(T_{amb}-T_{cold}) \quad (1)$$

As observed from Equation 1, the lower the ambient temperature, the higher the COP and hence, the more efficient the air conditioner's operation. Operating at higher efficiency is another advantage of shifting the cooling load from hot days to cooler nights.

In winter time, the same transition stores solar energy during the day for recovery on cold nights. The same PCM, now in solid phase at outside nighttime temperature, acts as a heat storage device to store solar energy and reduce fuel consumption after sundown. Presence of PCM in the room and its surroundings also helps to dampen the oscillating temperature control profile associated with most thermostats.

To summarize, PCM systems can store heat (e.g., solar energy), store cold (e.g., off-peak air conditioning), and control temperature (by undergoing phase transition within the desired temperature range). As such, their innovative and cost-efficient deployment in buildings and other dynamic thermal systems can decrease $CO_2$ emissions associated with heating and air conditioning, improve thermal efficiency of buildings, and reduce size/cost of air conditioning units.

Refrigerants, typically fluorinated hydrocarbons, are potent greenhouse gases themselves. Use of smaller air-conditioning units translates to lower amounts of refrigerant emissions.

PCM compositions include any component having the desired phase transition temperature and a relatively high corresponding latent heat value. Both inorganic and organic compositions are cited in prior art, such as salt hydrates and paraffins. Paraffins are considered particularly suitable because of their low toxicity, material compatibility, thermo-oxidative stability, and water repellent properties. One disadvantage of paraffins is their flammability. Even though the flash points of most PCM-range paraffins are well above 100° C., they can fuel a fire.

Many PCM applications require the material to retain its shape whether the phase changing component is in solid or liquid phase. The prior art describes microencapsulation and macroencapsulation methods to produce such "form stable" or "shape stable" PCMs. Microencapsulation is the encapsulation of solid or liquid particles of 1 micron to 1 mm diameter within a solid shell. Although physical processes like spray drying have been proposed, one method for production of shell-core PCM microcapsules is a batch chemical process known as coacervation.

Coacervation is the formation of two liquid phases—typically a polymer and another organic liquid. This was the basis for the classic method developed by National Cash Register (NCR) for carbonless copy paper as well as many other applications, including controlled release agricultural and pharmaceutical products. In the first step of microencapsulation by coacervation, a gelatin is dissolved in water to form a "sol," which is then heated to solubilize the gelatin. Then the PCM paraffin is dispersed in the aqueous gelatin solution at a temperature range of 40-60° C. At this temperature range, the solution of the shell material is liquid. The suspended paraffin droplet size is controlled by agitation/stirring rate and/or use of surfactants. The pH is then adjusted (typically to 4.0-4.5 range) to cause the gelatin to deposit around the core paraffin material. At this point, the system is cooled to around room temperature, for the hardening of the shell. This can be done by adding a cross-linkable water soluble polymer such as urea-formaldehyde. The pH is then raised to 9.0-11.0 range by addition of a sodium hydroxide solution. The PCM microcapsule slurry is then cooled down further to the 5-10° C. range and maintained at that temperature for 2-4 hours. The microcapsules are then filtered or centrifuged and dried to yield a PCM product with a powder-like appearance.

The small batch operation, provisions for handling the toxic polymers/initiators, as well as water treatment costs, make PCMs produced by this process expensive. These microcapsule PCMs command a high price and target low volume specialty product markets. Furthermore, the small size of the microcapsules prevents them from being used as PCM devices by themselves and are therefore incorporated into other articles, adding another step in the manufacturing process.

Building products that act as "carriers" for the PCM microcapsules are typically wallboards (e.g., gypsum boards) and ceiling tiles. However, since the PCM microcapsules are trapped within the wallboard, heat transfer is conduction/radiation limited and not driven by the more efficient natural or forced convection mechanisms (e.g., turbulent flow of air around the PCM particle). This limits the overall heat transfer coefficient between the PCM and the air within the room, and since there is only about 6-8 hours of off-peak air conditioning available for removing all the heat stored during the day, the effectiveness of the PCM system is similarly limited.

Macroencapsulation involves filling plastic containers resembling small yogurt or Jell-O® cups with the PCM. These macroencapsulated PCM devices can be fabricated in automated production lines making final products resembling sealed dimpled sheets or large bubble wraps. Macroencapsulation is commonly used for inorganic PCMs. However, several technical issues have limited their use for organic PCMs. One issue is solubility (and hence incompatibility) of most common macroencapsulation material, like low density polyethylene (LDPE) in paraffins. Use of metal containers has also been proposed for macroencapsulated PCMs. However, these have the disadvantage of being too heavy and costly for most PCM applications. Another disadvantage of macroencapsulation is that during the freezing of the paraffin melt, the wall cools before the bulk of the paraffin. As a result, a wax film can form on the inside walls of these macroencapsulation storage units that reduces the rate of heat transfer from the molten paraffin mass within. This can lead to significantly reduced thermal storage performance.

The prior art also describes PCM composites that may be converted into pellets. For example, some polymer composites include a cross-linked high-density polyethylene powder (HDPE) and a PCM paraffin. These patents teach the use of cross-linked HDPE and ethylene-vinyl acetate (EVA) copolymers to provide form-stable "non-exuding" PCM composites. Exuding or "oozing" of paraffin from conventional HDPE is a problem. However, cross-linked HDPE is costly, while EVA reduces the composite's melt viscosity, making conventional pelletizing difficult and limiting the amount of PCM paraffin that can be incorporated. Finally, such methods do not address the issue of organic PCM flammability.

There is thus a need for products, methods, and apparatuses for effective utilization of PCM in applications that can reduce peak cooling load. Furthermore, these need to be of simple design, low cost, and suitable for wide deployment such that peak load electricity demand and corresponding $CO_2$ emissions are significantly reduced. It is to such products, methods and apparatuses that the present disclosure is directed.

SUMMARY

Plastic PCM compounds comprising an organic PCM and a polymer are disclosed. Also disclosed are methods to convert said compounds into various form-stable PCMs: pellets, injection molded articles, extruded sheets, and extruded tubes. One aspect of the invention is a method of coating said PCMs to provide PCMs with substantially no paraffin seepage and with improved ignition resistance properties. Latent heat storage articles and systems made from these plastic PCM compounds are disclosed: articles comprising the pellets and a carrier (such as a conventional construction material), articles having fixed-bed modules of the pellets, and systems having a combination of a fan/blower and a fixed- or fluidized-bed of the pellets. Another aspect of the disclosure is injection molded latent heat storage articles such as louvers, shingles, ventilation duct inserts, and tiles. A coating method for these articles is also provided, whereby paraffin seepage is substantially eliminated. Also disclosed are extruded sheets of the PCM compound, and their use within layers of insulation, and for attaching behind wallboards and as part of roofing systems. Extruded PCM tubes and latent heat storage articles employing PCM tubes, such as ceiling fixtures, curtains, and ventilation duct inserts, are also disclosed.

BRIEF DESCRIPTION OF THE DRAWINGS

FIG. 6A is a finned ceiling tile made by injection molding of a plastic phase change material.

FIG. 6B is the ceiling tile of FIG. 6A along A-A.

FIG. 6C is the ceiling tile of FIG. 6A along B-B.

DETAILED DESCRIPTION

Herein disclosed are systems and methods for the production of plastic PCM compounds and converting said compounds to form-stable PCMs such as pellets, injection molded articles, extruded sheets, and extruded tubes/pipes. Also disclosed, are methods to coat said converted form-stable PCMs wherein the coating eliminates, or substantially reduces, seepage of organic PCM therein and imparts ignition resistance. Via the disclosed production system and method, PCM pellets/granules/beads having advantageous properties, such as ignition resistance and solvent resistance, may be manufactured at lower cost than methods of prior art. Also disclosed, are articles for latent heat storage and methods of manufacturing these articles using methods and systems developed for large volume production of plastic commodities. Energy saving cooling/heating systems taking advantage of cold/heat storing properties of the plastic compounds are also disclosed.

According to this disclosure, organic PCM such as paraffins, fatty acids, fatty acid esters, fatty alcohols, sugar alcohols, or glycols, are compounded with a thermoplastic polymer and pelletized. In some embodiments, the pellets are coated to provide shape-stable PCM pellets with substantially no organic PCM seepage and displaying ignition resistance.

In some embodiments, this disclosure provides detailed description of the plastic PCM compounds, and systems/methods for converting these to latent heat storage articles. These PCM compounds have phase transition temperatures from about 10° C. to about 135° C., and latent heats from about 60 J/g to about 160 J/g. The PCM pellets and converted articles are coated to reduce or eliminate seepage of molten organic compound, enhance solvent resistance, and impart ignition resistance.

In some embodiments, this disclosure provides description of inventive energy saving articles made from the PCM compounds. These articles enable off-peak cooling to be stored in the compound, reducing use of air conditioning during peak load periods.

In some embodiments, the plastic PCM compounds are injection molded into latent heat storage articles. These articles include ventilation duct inserts, ceiling tiles, wall fixtures, and the like.

In some embodiments, the plastic PCM compounds are extruded into sheets. These latent heat storage sheets are incorporated in building envelopes to reduce the building's net heat gain in summer and net heat loss in winter. PCM enhanced building envelope systems disclosed include extruded PCM sheets in layered insulation systems, for attachment behind wallboards and ceiling boards, and as a roofing underlay.

In some embodiments, this disclosure provides description of inventive energy saving systems utilizing the PCM compounds. These systems can be adapted to energy-efficient construction and building retrofits.

Figure 1A:
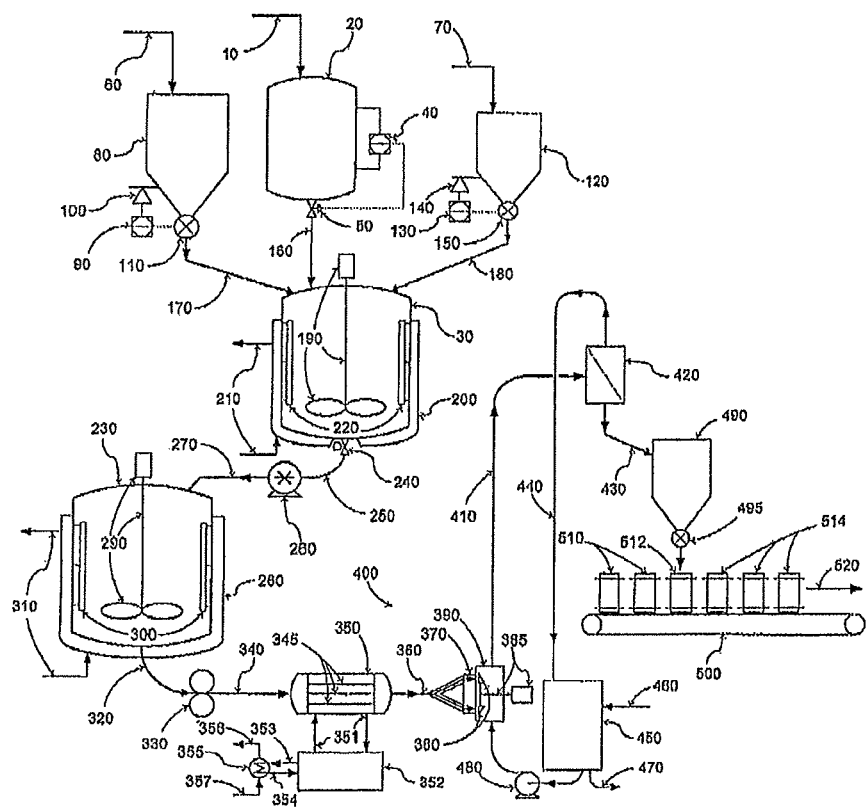
FIG. 1A is a schematic diagram of an operation of a process according to the present disclosure.

One embodiment of the present disclosure is presented in FIG. 1A. A paraffin wax 10 is transferred to a wax storage tank 20. Paraffin wax 10, for example, is a normal paraffin having a carbon number between 14 and 22. For example, paraffin includes 60-100 wt % n-octadecane, and has a melting point between about 50° F. (10° C.) and about 122° F. (50° C.), preferably between about 64° F. (18° C.) and about 82° F. (28° C.). The paraffin has a heat of fusion between about 100 and 240 J/g. The paraffin wax 10 may be obtained from a number of chemical and refining operations such as Fischer-Tropsch synthesis, ethylene oligomerization followed by hydrogenation of $C_{14}$-$C_{22}$ linear olefins, or via mole sieve separation of petroleum fractions. A bio based process for production of n-paraffins involves hydrodeoxygenation of lipids using a hydrogenation catalyst having hydrogenolysis and olefin saturation activity. The lipid fatty acid/ester oxygen atoms are removed and double-bonds therein saturated. In a preferred embodiment, the octadecane-rich wax composition is the product of hydrodeoxygenation of lipids such as canola oil.

The paraffin wax 10 is transferred to a mix tank 30 where it is mixed with other ingredients for pelletizing. A level transmitter 40 and an automatically activated valve 50 are used to ensure the proper amount of paraffin wax is introduced to the mix tank 30. Paraffin wax storage tank 20 is typically located at a higher elevation than the mix tank 30, thus allowing for gravity flow of the paraffin. In some embodiments, a pump is used to transfer the contents of the storage tank 20 to the mix tank 30. The other mix components include a polymer 60 and an additive composition 70.

The polymer 60 is, for example, an HDPE powder. The polymers have a molecular weight greater than 100,000 and are compatible with the paraffin wax, or have at least one wax compatible phase. Some polymers have flame retardant properties which is useful when the PCM is used in building and construction applications. Examples of such polymers include halogenated or halogen-modified polymers, or those additized with flame-retardants. A preferred polymer is HDPE having a melt flow index (or melt flow rate) less than 50 g per 10 minutes. Melt flow index (MFI) is a measure of the polymer's molecular weight and melt viscosity; the higher the molecular weight and melt viscosity, the lower its MFI. The most preferred polymer is HDPE having MFI values between about 0.1 g/10 min and about 20 g/10 min. However, it should be understood by one of ordinary skill in the art that various polymers may be utilized so long as the polymer functions in accordance with the present disclosure as described herein.

The polymer 60 is loaded into a hopper 80, from where required amounts for PCM compounding are transferred to the mix tank 30 using a mass flow control loop 90 including a load cell 100 and solids flow valve 110. Typically, hopper 80 is at a higher elevation than the mix tank 30, thus allowing for gravity flow of polymer 60 through conduit 170. If hopper 80 is not at a higher elevation, pneumatic transport, screw conveyor, or bucket elevators may be used to transfer the contents to the mix tank 30.

The additive composition 70 is optionally added to the mix tank 30 to enhance the PCM pellet performance. The additive composition 70 is a solid (powder or flake) blend, including a thermal conductivity improver, a nucleating agent, an antioxidant, and/or a flame retardant. Thermal conductivity improvers are optionally added to increase the rate of heat transfer from the PCM pellet walls to the paraffin clusters trapped therein. Prior art teaches use of expandable graphite, graphite microfiber pieces, or graphite powder for this purpose. It should be understood by one of ordinary skill in the art that any material having thermal conductivities higher than the polymer and the wax—for example, in microfiber form—may be used as the thermal conductivity improver.

Nucleating agents include organic and inorganic material that can form a site for crystal growth, thus preventing sub-cooling or reducing the extent of sub-cooling. Sub-cooling is when a molten material does not freeze when cooled to its melting point, but several degrees lower. The nucleating agents suitable for use in PCM pellets include inorganic salts, such as sodium and calcium chloride, or organic compounds having a higher melting point than the paraffin, but with a similar alkyl group. A suitable organic nucleating agent for the present disclosure includes 1-octadecanol. It should be noted that 1-octadecanol is also a reaction intermediate during hydrodeoxygenation of vegetable oils to paraffins, and thus, may be present in n-octadecane produced via hydrodeoxygenation.

Antioxidants/stabilizers include hindered phenols, phosphites, and hydroxylamines. Flame retardants include halogenated organic compounds, as well as organo-antimony and organo-phosphorus compounds. Antioxidants/stabilizers are added mainly to protect the polymer and wax from degradation at high compounding temperatures (e.g., in the mix tank 30, or an extruder).

The additives that include the additive composition 70 may be in the form of a master-batch. As such, the additive composition 70 is placed in an additive holding and transfer vessel 120. If the components that include additive composition 70 are not pre-blended as a master-batch, individual holding and transfer vessels for each component will be required such that they can be dosed individually to the mix tank 30. The amount (defined below) of additive composition 70 is transferred to the mix tank 30 using a mass flow control loop 130, including a load cell 140 and solids flow valve 150. Typically, vessel 120 is at a higher elevation than the mix tank 30, thus allowing for gravity flow of solid additive composition 70 through conduit 180. If vessel 120 is not at a higher elevation, pneumatic transport, screw conveyor, or bucket elevators may be used to transfer the contents to the mix tank 30. The rate of transfer of solids through conduits 170 and 180 may need to be controlled (through control loops 90 and 130, respectively) to ensure that the solids are well dispersed and/or melted.

The paraffin wax, the polymer, and the additives are charged to the mix tank 30 through conduits 160, 170, and 180, respectively. The order of addition depends on the type of equipment used as the mix tank 30. The mix tank 30 may be a viscous melt batch mixer (e.g., Banbury or Henschel mixers) or a continuous extruder. The extruder may be a single-screw mixer, a twin-screw co-rotating mixer, or a counter-rotating mixer. In the embodiment of FIG. 1A, the mix tank 30 is shown as a heated vessel equipped with a mixing device appropriate for the relatively high viscosity polymer melt composition. For this system, the polymer and additive are added to the pool of molten wax. A mix tank agitator 190, including a motor, shaft, and propeller blade, is kept on during addition of all ingredients. The paraffin wax 10 and polymer 60 are charged at a ratio (paraffin:polymer) of from about 50:50 to 90:10, preferably from about 60:40 to about 80:20. The additives 70 are then dosed through a conduit 180. The additive composition 70 and dosing level are such that the amount of nucleating agent in PCM paraffin is from about 0 to about 10 wt %, the thermal conductivity improver is from about 0 to about 2 wt %, the flame retardant is from about 0 to about 10 wt %, and the anti-oxidant is from about 0 to about 0.1 wt %.

In order to ensure a homogenous molten composition is achieved, the mix tank 30 is equipped with a jacket 200 wherein a heat transfer fluid 210 circulates. The mix tank 30, agitator 190, and baffles 220 assist with heat transfer from the mix tank 30 walls to its contents. The heat transfer fluid 210 is supplied from a hot oil system (not shown), including a storage and expansion tank system with electric or direct-fired heating, and with a recirculation pump. The hot oil system is designed to maintain the mix tank 30 temperature between about 250° F. and about 550° F.

The homogeneous molten PCM composition prepared in the mix tank 30 is transferred to a pelletizer feed tank 230. When a continuous mixer such as an extruder is used, the pelletizer feed tank 230 is not required. For the mix tank 30, the transfer is achieved by opening the block valve 240 and turning on pump 260 and thus, the molten PCM composition flows through conduits 250 and 270. Any number of pump types known to those having ordinary skill in the art may be selected for use as pump 260 based on the transfer temperature and corresponding PCM compound melt properties such as density and viscosity. Examples of pump types include positive displacement (gear, lobe, screw, diaphragm) and centrifugal. Preferred pumps for the transfer of liquids have viscosities in the 10,000 to 300,000 cP include gear, screw, and lobe pumps.

The pelletizer feed tank 230 includes many of the same features of the mix tank 30 such as an agitator system 290, baffles 300, and vessel jacket 280. Furthermore, as with the mix tank 30, heat transfer fluid 310 (as described previously herein) is allowed to circulate through vessel jacket 280 to maintain the PCM molten composition at desired temperature of from about 250° F. to about 550° F. When the volume of pelletizer feed gets low, a new batch of molten PCM compound is prepared in the mix tank 30 and is transferred to the pelletizer feed tank 230.

The molten pelletizer feed tank PCM composition is transferred through conduit 320 to a gear pump 330 where it is pressurized and transferred to an optional melt cooler 350 through conduit 340. Conduit 340 pressure is in the 200 to 2,000 psig range, depending on the melt viscosity and flow restriction provided by the apparatuses downstream. The molten PCM is cooled in melt cooler 350 to cooled PCM melt 360. The temperature of the cooled PCM melt 360 is from about 200° F. to about 400° F. The purpose of cooling the melt is to raise its viscosity to at least about 4,000 cP. This ensures that extrudates of this melt, formed by pressuring the melt through orifice holes, have sufficiently high melt strength to be cut. When the molten PCM compound in conduit 250 has a viscosity higher than 4,000 cP, preferably above 10,000 cP, the melt cooler 350 is not required.

The melt cooler 350 is a shell and tube heat exchanger. The PCM melt flows through the tubes 345 while a heat transfer fluid (HTF) 351 flows through the shell. Static mixer elements are inserted in the tubes 345, thereby improving heat transfer. Without static mixer elements, or similar tube internals, heat transfer coefficients would be low due to laminar flow of the PCM compound. As a result, a prohibitively large heat transfer surface would be required. Lacking provisions for improving heat transfer coefficient with laminar flow through tubes 345 also necessitates lower shell side temperatures which, in turn, may cause PCM freeze-off on the tube 345 walls.

The HTF temperature is controlled in a heat transfer fluid unit 352. The HTF temperature is controlled to be higher than the melting point of the crystalline polymer in the PCM compound. For paraffin/HDPE PCM compounds, the HDPE polymer has a melting point of about 250° F. (120° C.). Typical HTF temperatures are in the 250° F. to 350° F. range, preferably between about 260° F. and about 300° F. The temperature of the HTF is thus controlled to be higher than the melting point of the polymer to ensure that no PCM components freeze on the walls of tubes 345 as the PCM is being cooled. The HTF temperature is controlled via circulation through an HTF cooler 355. The HTF cooler 355, in turn, uses cooling water for cooling the HTF, as needed for temperature control purposes. In this embodiment, cooling water is supplied through conduit 357, removing some of the heat from the HTF, and returning cooling water through conduit 356. The HTF unit 352 is also equipped with heating capability either through a gas or liquid fuel fired heater, or an electric heating element (not shown).

The pressurized and optionally cooled PCM stream 360 enters an underwater pelletizer assembly 400 including a die 370, rotating knives 380, and a water chamber 390. The die 370 is circular in shape and includes a plurality of orifice holes, arranged in a circular pattern. Depending on PCM throughput, the die 370 may have between 10 and 1000 holes. In some embodiments, the die 370 is heated (e.g., by an electric band heater) to prevent freeze-off of molten PCM in the holes.

The rotating knives 380 are set flush against the face of the die 370 in the water chamber 390. The rotating knives 380 are supported by a shaft and motor assembly 385, with the motor outside the water chamber 390. As the molten PCM extrudate exits the die 370, it is cut by rotating knives 380 under water. The cut pieces of molten PCM extrudate form into pellets, which are rapidly cooled and carried by water through a pellet slurry pipe 410 (wherein additional pellet cooling takes place in the 1 to 10 second residence time provided by the pipe 410) to a spin dryer 420. Therein, PCM pellets 430 are separated from water and air-dried while spin dryer water 440 enters a pelletizer water tank 450. The pelletizer water tank 450 is equipped with a makeup line 460 and a purge line 470, to maintain tank level and water quality. The purge water in line 470 contains pellet fines and components in the PCM compound which may have migrated into the water phase. As such, the purge water is directed to filtration and/or water treatment (not shown).

In some embodiments, the pelletizer water tank 450 is equipped with coils (not shown) for controlling the water temperature. In general, pelletizer water temperature best-suited for pelletizing PCM according to the present invention is between about 70° F. to about 200° F. The water temperature is at a temperature between the melting point of the paraffin and the melting point of the polymer. Pelletizer water of fairly constant temperature and quality is thus circulated through the water chamber 390 through a pump 480. Pump 480 is preferably a centrifugal pump sized to provide turbulence in the water chamber 390 and the pellet slurry pipe 410.

Although an underwater pelletizer is described in this embodiment of the disclosure, it should be recognized by those skilled in the art that other pelletizers may be used so long as the pelletizer functions in accordance with the present disclosure as described herein. For example, a strand pelletizer may be used, wherein the molten extrudates are pulled as strands through a water trough where they are partially or completely solidified before being chopped into pellets. Whereas the pellets formed in an underwater pelletizer are typically spherical, those formed in a strand pelletizer are typically cylindrical. Nevertheless, the size of both types of pellets may be given by an equivalent diameter. For non-spherical pellets, the equivalent diameter is defined as the diameter of a sphere having the same surface area as the non-spherical pellet.

The dewatered and dried PCM pellets 430 are transferred to a bagging hopper 490. Depending on pelletizer die 370 orifice size, rotation rate of the rotating knives 380, and pelletizer gear pump 330 flow rate, the typical size of pellets 430 may be between about 0.1 mm and about 5 mm in diameter. For most PCM applications, the preferred size is between about 0.5 mm and about 2 mm, where it is small enough for high heat transfer rate, but not too small to create handling problems. For example, this size range can easily be incorporated into the gypsum slurry used to make standard wallboards. The smaller the pellet, the higher the PCM surface area to volume ratio and the higher the rate of heat transfer.

The pellets 430 from the bagging hopper 490 are transferred to bags, drums, or other containers. The empty containers 510 are moved on a conveyor belt 500 to under the bagging hopper 490 and filled via fill valve 495. The filled containers 514 are then palletized (not shown) and moved to warehouse for distribution. The bagging or drumming operation may be automated or performed manually.

The PCM compounding and the continuous pelletizing process of the present disclosure are well-suited for process automation. The PCM pellets produced in this low-cost production process are useful in diverse passive energy storage applications. These applications include, but are not limited to, building energy efficiency products (e.g., wallboards, attic insulation, and roof shingles), clothing, footwear, and furniture.

Figure 1B:
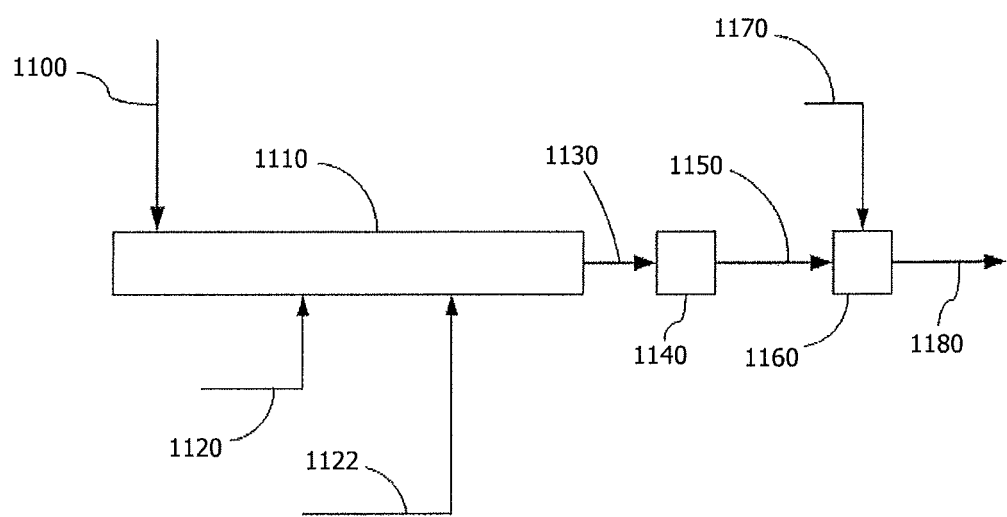
FIG. 1B is a schematic diagram of a process for the production of plastic PCM compounds and further conversion of said compounds to coated PCM pellets according to an embodiment of the disclosure.

Referring now to FIG. 1B is a schematic of a system for the production of PCM pellets. A thermoplastic polymer indicated by reference number 1100, is transferred to an extruder 1110.

In one embodiment, the polymer 1100 is a crystalline polymer, such as, for example, a high density polyethylene (HDPE) with an average molecular weight greater than 100,000 and a melt flow index less than 10 g/10 min. In one embodiment, the HDPE has a density of 956 kg/m$^3$, a melt flow index of 6 g/10 min. The polymer 1100, HDPE powder or pellet, is introduced into the extruder 1110 using a hopper (not shown), in one embodiment, equipped with instrumentation (such as for loss in weight measurement and control) to measure rate of HDPE transfer to the extruder 1110. In one embodiment, the extruder 1110 is a twin-screw extruder with multiple heating zones, with instrumentation for temperature indication and control, and also equipped with a plurality of liquid injection ports. Twin-screw co-rotating or counter-rotating extruders are described in the prior art, such as U.S. Pat. Nos. 4,875,847, 6,609,819, 6,613,128, 3,856,278, 4,900,156, 7,594,807, 8,079,747, 5,297,864, 4,423,960, and 4,935,183. The extrusion prior art also describes provisions for processing low melt viscosity compounds, e.g., U.S. Pat. Nos. 6,426,026, and 6,716,527.

An organic PCM 1120 (and optionally an organic PCM 1122) is introduced to the extruder 1110 for mixing with the polymer 1100. The organic PCM 1120 includes organic substances having the desired melting point and heat of fusion. Any organic PCM 1120 and polymer 1100 may be used as long as the organic PCM 1120 and the polymer 1100 are compatible to be compounded therein (i.e., it forms a homogeneous melt). Examples of suitable organic PCM 1120 include paraffins, fatty acids, fatty acid esters, fatty alcohols, sugar alcohols, glycols, and various waxes (including petroleum, Fischer-Tropsch, and polyolefin waxes). The organic PCM 1120 is preferably introduced as a liquid/melt in a zone downstream of the polymer 1100, HDPE, introduction zone. In one embodiment, the organic PCM 1120 is a paraffin composition including n-octadecane, but depending on the final PCM application and service temperature range, and may include other paraffins, or combination of paraffin and the other organic chemicals cited previously. The PCM 1122 may be the same composition as PCM 1120, or may be a different paraffin composition. For example, in one embodiment, the total paraffin:HDPE weight ratio (mass flow of stream 1120 and 1122 to mass flow of stream 1100) is in the 0.5:1 to 10:1 range, preferably between 2:1 and 4:1.

Additives such as thermal conductivity improvers, nucleating agents, UV stabilizers, anti-oxidants, flame retardants, and color concentrates (pigments) may be added to the extruder 1110 separately (not shown), or combined with the organic PCM 1120, paraffin and/or polymer 1100, HDPE, to achieve the desired additive concentrations in a plastic PCM compound 1130.

The molten paraffin/HDPE mixture, i.e., the plastic PCM compound 1130, enters a pelletizer 1140 through a die (not shown) as an extrudate. The extrudate is typically a strand or plurality of strands with a melt strength proportional to the HDPE melt flow index and the paraffin:HDPE ratio. The pelletizer 1140 converts the molten plastic PCM compound into pellets 1150 of spherical or cylindrical shape with average diameters in the 0.5 mm to 10 mm range.

In one embodiment, the pelletizer 1140 is an underwater pelletizer. In an underwater pelletizer, the outside face of the extruder die is flush against rotating knives inside a water box wherein water circulates at turbulent flow conditions. Underwater pelletizers are described in detail in prior art references such as U.S. Pat. Nos. 5,059,103, 4,728,276, 5,435,713, and 4,300,877.

The molten strand(s) of the PCM compound 1130 are thus cut into small pellets by rotating knives under water and transported with water to a spin dryer (not shown) where a dry pellet stream 1150 is produced.

The pellets from stream 1150 are coated in a coater 1160 to form a coated PCM pellet product 1180. The purpose of the coating is to impart ignition resistance to the plastic PCM pellets, minimize or eliminate paraffin seepage, and impart solvent resistance to the pellets such that paraffin trapped therein is not extracted in the presence of solvents. A coating media 1170 is contacted with the pellets from stream 1150 in the coater 1160. The coater 1160 may be a fluid-bed dryer wherein the coating media 1170 is sprayed onto the pellets fluidized with air. Such fluidized-bed coaters are described in prior art references, including U.S. Pat. Nos. 3,196,827, 4,117,801, 4,217,851, 5,236,503, 6,312,521, 6,579,365, and 7,147,717.

The coating media 1170 may be a water- or solvent-borne polymer. The fluidizing gas, typically air, is heated to the 40-80° C. range, high enough to drive off the water or solvent and form a dry film of the coating media around the fluidized pellets. Fluid-bed spray coaters/dryers may be configured for batch or continuous operation. In one embodiment, the fluid-bed coater/dryer is a batch unit and the coating media 1170 includes polyvinylidene chloride (PVDC). In another embodiment, the coating media 1170 is applied as an ethyl cellulose pre-coat followed by a PVDC coating. Halogenated top coatings such as PVDC have good barrier and ignition resistance properties. The total coating weight is 10-30% of the total weight of coated pellet 1180. In one embodiment, ethyl cellulose includes 2-7%, and PVDC includes 15-25% of the total coated pellet weight. Ethyl cellulose is applied as a 5-30% solution in an organic solvent and PVDC as a 30-60% colloidal dispersion in water (i.e., as an emulsion polymer or latex).

In another embodiment, the coater 1160 is a dry blending equipment and the coating media 1170 is a fine inorganic powder. Examples of dry blending equipment include tumblers (e.g., cement mixers), ribbon blenders, twin shell dry blenders (V-blenders), and the like, while examples of fine inorganic powders suitable for pellet coating include calcium silicate, magnesium hydroxide, and fumed silica. Inorganic powders have oil-absorbing and/or flame retardant properties. Such an embodiment involves coating the pellets with calcium silicate powder having an average particle size of 0.5-50 micron, preferably 1-10 micron, in a V-blender.

In yet another embodiment, the dry-coated plastic PCM pellets are spray-coated with PVDC latex. Regardless of the type of coating—inorganic/powder, polymer film, or combinations thereof—the PCM pellets will be completely coated. In another embodiment, coated pellets have two distinct layers, each having a thickness between 10 and 200 microns. The coating coverage, the two distinct layers, and the thickness, are analyzed by scanning electron microscopy (SEM) of the sliced pellet cross-section.

The coated pellets 1180 have a melting point in the 21-25° C. range, a heat of fusion of 60-160 J/g, feel dry to the touch, and show no paraffin seepage, or substantially reduced paraffin seepage, compared to non-coated plastic PCM pellets. The pellets 1180 are well-suited to be used as PCM products, or as components in devices having latent heat storage features. These PCM pellets 1180 may be configured directly into novel PCM articles as described later in this disclosure. Alternatively, the PCM pellets 1180 produced by the method and system described herein may be employed as a lower cost alternative to microencapsulated PCM used in PCM-enhanced building construction products described in the prior art. These latter products include wall and attic insulation, wallboards, ceiling boards, and ceiling tiles.

In the plastic PCM product applications, such as energy efficient buildings, the maximum temperature does not approach the polymer melting point. HDPE, for example, has a melting temperature in the 110-135° C. range, with a heat of fusion of about 200 J/g. In an alternative embodiment of this disclosure, a PCM pellet can be produced for storage and recovery of energy at substantially higher temperatures. In this embodiment, conventional crystalline polymers, such as HDPE or isotactic polypropylene (pelletized without paraffin) are directed to the coater. In one variation of this embodiment, HDPE pellets are coated with a layer of ethyl cellulose in a fluid-bed spray coater/dryer. A top coat of PVDC is then applied as previously described herein. In this application, the relatively high service temperature of PVDC (up to 177° C.) ensures that the molten crystalline polymer stays within the solid shell formed by the coating polymer. The PVDC-coated HDPE pellets are useful as PCM for latent heat storage at the HDPE melting temperature range of 110-135° C. High temperature PCM pellets may be configured directly into novel PCM apparatus as described later in this disclosure.

Figure 2:
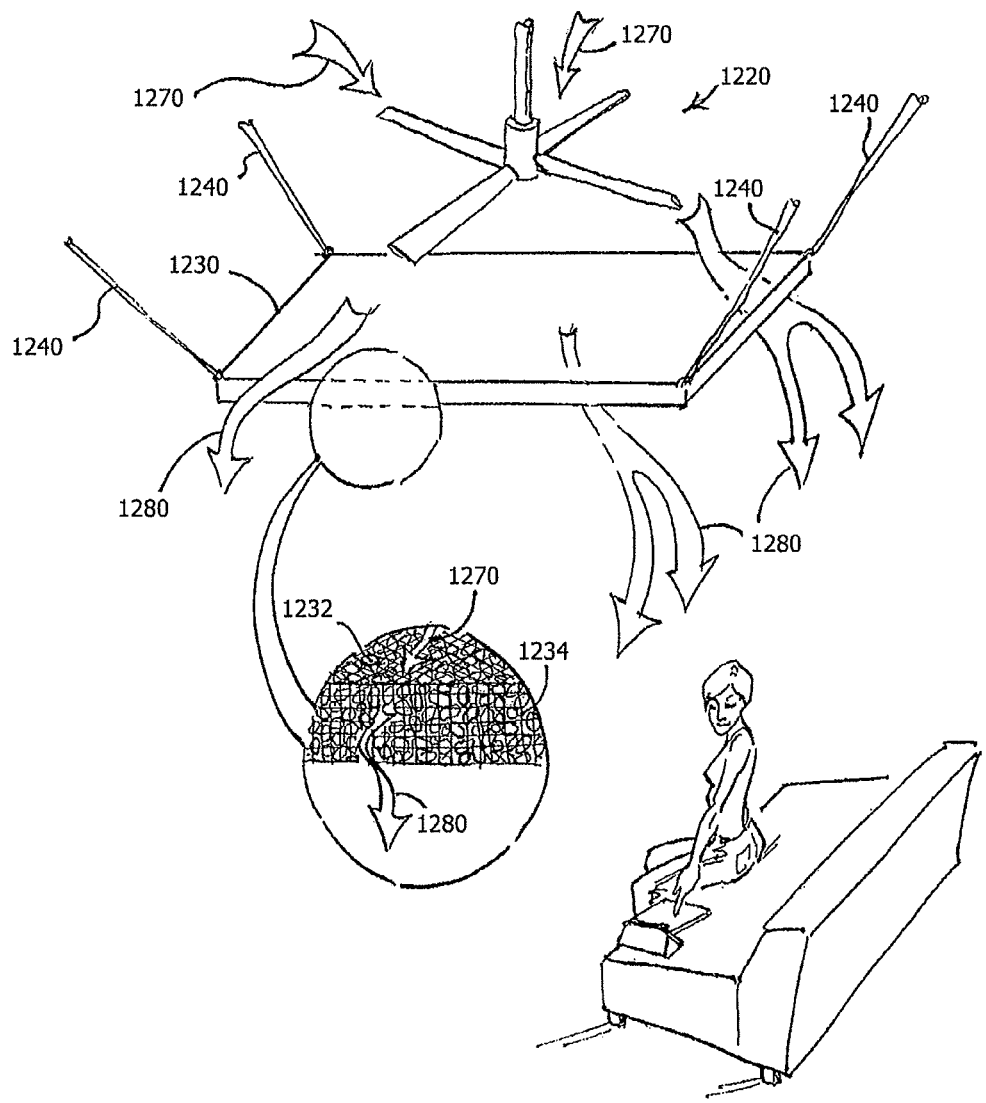
FIG. 2 is an embodiment of a fixed-bed PCM pellet module, an article for shifting air conditioning operation to off-peak electricity.

Some of the articles made from the PCM pellets of this invention are directed to cooling rooms/buildings with reduced use of peak load air conditioning. An embodiment of such an article is shown in FIG. 2. Referring to FIG. 2, a rectangular fixed-bed PCM pellet module 1230 is filled with PCM pellets or granules 1232. The fixed-bed pellet module 1230 includes a wire-mesh screen 1234 on all six sides. Any type of wire-mesh screen may be selected for the fixed-bed module so long as it can support the weight of the pellets retained therein. The size of the open space provided by the wire-mesh needs to be smaller than the size of the pellets retained therein. For example, for pellets of 2 mm to 3 mm in size, the wire-mesh screen openings needs to be finer than a 10 mesh screen (2 mm retention). As such, use of 12 mesh, 16 mesh, and 20 mesh, are all options for constructing the fixed-bed PCM module 1230. The fixed-bed PCM module 1230 dimensions are typically 1 m to 3 m length, 0.5 m to 2 m width, and 6 mm to 100 mm thickness. One embodiment of the thickness range is typically 10 mm to 60 mm. For most applications, the rectangular fixed-bed pellet module is sized to provide 100 kJ to 400 kJ of latent heat storage capacity per $m^3$ of cooling space. For a coated PCM pellet having a latent heat of 80 J/g and a packed density of 470 kg/$m^3$, this translates to a fixed-bed PCM module volume of 0.0027 $m^3$ to 0.011 $m^3$ per $m^3$ of cooling space. A living space with dimensions of 2.3 m×2.3 m×6 m (31.7 $m^3$), thus requires a fixed-bed module between 0.084 $m^3$ and 0.34 $m^3$. A 1.6 m×2.1 m fixed-bed PCM pellet module of 50 mm thickness would have a volume of 0.17 $m^3$ (corresponding to 80 kg of said pellets) and is thus a suitable embodiment of the inventive cooling article disclosed herein.

In one embodiment, the fixed-bed PCM pellet module 1230 is suspended from the ceiling by cables 1240 (attached to each of its corners), with the module parallel to the ceiling. The cables 1240 should be able to support the weight of the fixed-bed module 1230 containing the PCM pellets 1232. In another embodiment, the fixed-bed pellet module 1230 is suspended directly under a ceiling fan 1220 such that the axis of rotation of the fan (i.e., its shaft) is above the geometric center of the rectangular module 1230. In one embodiment, the fixed-bed PCM module 1230 is preferably suspended 100 mm to 400 mm below the fan.

The warming indoor air 1270 is thus forced to the top surface of the fixed-bed module 1230 by the ceiling fan 1260. Since the PCM pellets 1232, packed in the module 1230, form a highly porous surface (i.e., the void in the packed bed of pellets), the warm air is forced by the fan 1220 to flow both through the bed and around it, providing a relatively high heat transfer coefficient from forced convection. The warming indoor air 1270 melts the PCM at a melt point in the 21-24° C. range (phase transition temperature of preferred PCM pellets for this embodiment) as it cools. The cooled air 1280 circulates and displaces the warming air 1270, keeping the occupants at the comfort temperature range of 21-24° C. until all the PCM in the pellets 1232 has melted. At this point, off-peak (base load) air conditioning re-freezes the PCM, re-setting it—or to use a battery terminology, "recharging it"—for the next day. In climates where nighttime temperatures are cooler than 21° C. and humidity is not an issue, outside air ventilation can be used instead of off-peak air conditioning at night. In either case, cold from nighttime air or off-peak air conditioning is stored in the fixed-bed module 1230 for cooling the room during peak power demand periods.

When the fixed-bed PCM pellet module 1230 is placed directly below the ceiling fan 1220, the main mechanism for heat transfer is forced convection. If the fixed-bed module 1230 were suspended from a ceiling without a fan, the heat transfer would still occur by natural convection and radiation from the surface of PCM module 1230, but providing a lower overall heat transfer coefficient.

Figure 3A:
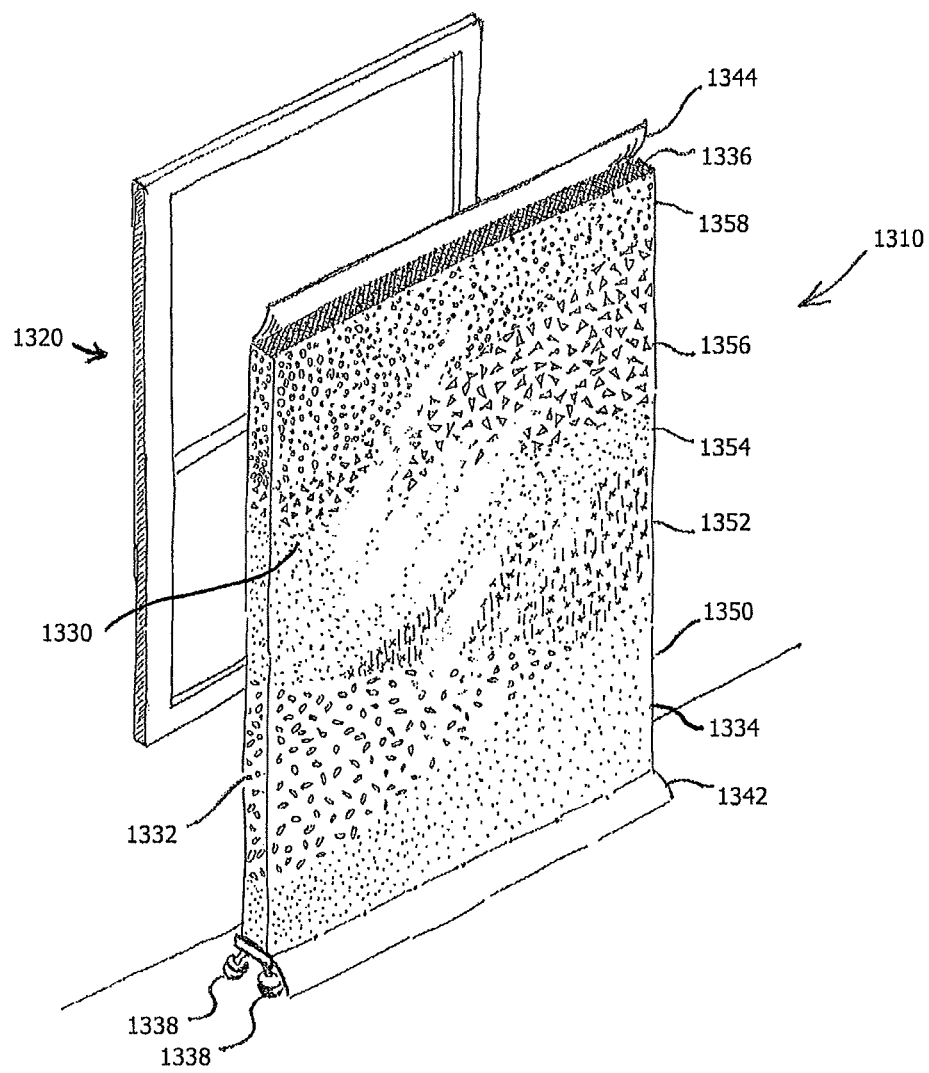
FIG. 3A is a modified Trombe wall, another embodiment of a fixed-bed PCM pellet module for enhancing energy efficiency of a building.

Referring now to FIG. 3A, shown therein is an embodiment of the present disclosure wherein a fixed-bed PCM pellet module 1310 is configured as a modified Trombe wall. Trombe wall is an energy saving building design feature for cold climates that was popularized by the French architect, Felix Trombe, in the 1960's. Trombe walls are several inches thick and built of concrete or other masonry. These walls are placed inside the building, directly across from a south-facing window/glazing. Trombe walls are typically equipped with dampers for flow of air up around the wall and into the rest of the room. During the day, the dampers are closed allowing solar radiation to heat up the air between the window and the wall and the wall itself. At nighttime, the wall's dampers are opened to allow circulation of room air around the Trombe wall and release of the solar energy stored in and behind the Trombe wall for heating the room. However, building thick concrete walls that generally block view from the south-facing window in a room is unattractive and not always practical. Given that the same thermal mass as the Trombe wall can be provided by a fixed-bed PCM pellet module having a fraction of the mass and thickness, the inventive modified Trombe wall drawn in FIG. 3A is disclosed.

In this embodiment of the fixed-bed PCM pellet module Trombe wall, for example, the fixed-bed PCM pellet module 1310 of a size about equivalent to the width and height of a wall with a south-side window 1320 of a room is provided. The thickness of the module 1310 is about 20 mm to about 60 mm. Unlike the fixed-bed PCM pellet module 1230 of FIG. 2, the modified Trombe wall has a polymethyl methacrylate (e.g., Plexiglas®) or polycarbonate (e.g., Lexan®) sheet for a back side 1330 not facing the window 1320, as well as the vertical sides 1332 and 1334. A side (not shown) facing the window 1320 and a top 1336 and bottom (not shown) include the same type of mesh screen described in the FIG. 2 embodiment. In the inventive modification, the fixed-bed module 1310 used as a Trombe wall is equipped with wheels 1338, top damper 1344 and bottom damper 1342. The module 1310 is preferably packed with layers of clear and different colored PCM pellets (indicated by color code references 1350, 1352, 1354, 1356, and 1358) in a random fashion to provide an aesthetically pleasing view. Even though the window 1320 is mostly blocked by the fixed-bed PCM pellet module 1310, in some modes of the embodiment, sunlight partially shines through the relatively thin "wall" of pellets, providing an even more attractive view through colored pellets.

During daylight, with the dampers 1344 and 1342 closed, the air between the window/glazing 1320 and the module 1310 is heated up by solar radiation and used to melt the PCM at a temperature in the 21-25° C. range and storing much of that as latent heat. After sundown, the dampers 1344 and 1342 can be opened to allow for the heat trapped in the PCM pellets and behind the modified Trombe wall to be released into the room and resulting in reduced consumption of fuel for heating. With much of a building's heat gain during summer also from solar radiation through windows/glazing, this embodiment of a fixed-bed PCM pellet module is also effective in shifting air conditioning demand to off-peak hours.

Since the modified Trombe wall embodiment of the fixed-bed PCM pellets is light weight and on wheels, it can be rotated at night, or moved. By moving the "wall," residents can move the thermal mass from the room with south-side glazing to a different area where the nighttime heat is needed more.

Additional articles based on fixed-bed pellet modules include HVAC duct inserts and wall frames. The HVAC duct insert comprises a fixed-bed pellet module placed anywhere within air conditioned air supply ductwork, preferably near the outlet registers/grills for easy access. The size of the module is dictated by the duct dimensions (for the module's length and width) and allowable pressure drop (for the module's thickness).

Another embodiment is the PCM wall frame. The PCM wall frame is similar to the Trombe wall described previously, but of a smaller size that can be hung from, or attached to walls. Furthermore, because these are flush against the wall, air circulation and convective heat transfer through the pellets is limited. As such, the main mechanism of heat transfer in these wall frames is radiation and conduction. In preferred embodiments, the fixed-bed module is built of extruded plastic sheet/profile and powdered metal or graphite is added to the fixed-bed module to enhance thermal conductivity. By tapping the frames, the powdered metal or graphite fills most of the void space in the fixed-bed of pellets (typically between 30% and 50% of the bed volume). The powdered metal can be any material having a thermal conductivity higher than the plastic compound. The side of the wall frames facing the room may be of a clear material (such as Lexan® or Plexiglas®) and preferably contain colored pellets arranged in a visually attractive style, or covered with a covering sheet matching the room's color and décor. The wall frames may be as small as a picture frame or as large as a full wall panel, with thicknesses between 10 mm and 60 mm. Having PCMs with a phase transition temperature in the 21° C. to 24° C. range, these wall panels store off-peak and nighttime cold, thus allowing for reduced daytime/peak load air conditioning.

Figure 3B:
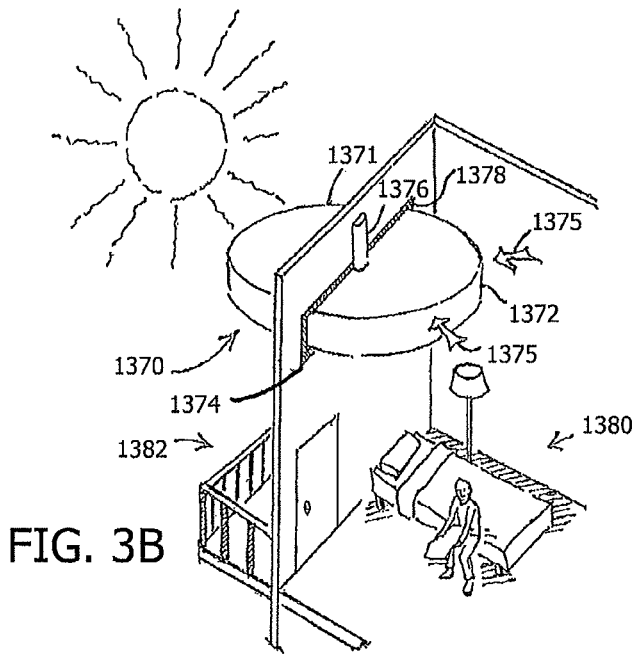
FIG. 3B is a PCM rotating wheel positioned during the daytime.
Figure 3C:
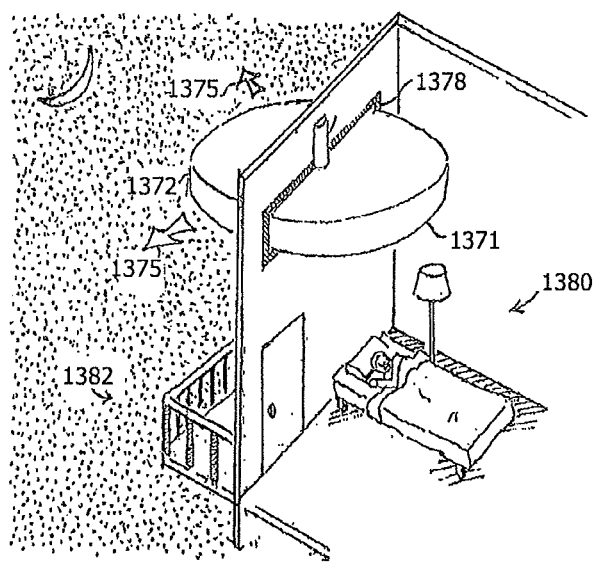
FIG. 3C is the PCM rotating wheel of FIG. 3B positioned in the nighttime.
Figure 3D:
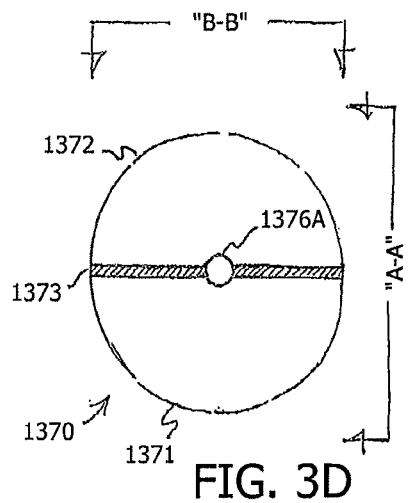
FIG. 3D is a top view of the PCM rotating wheel of FIGS. 3A and 3B.
Figure 3E:
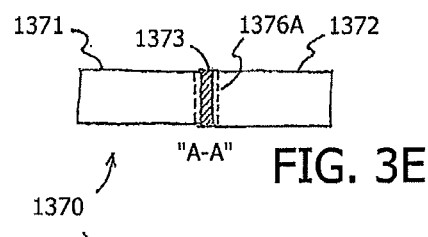
FIG. 3E is a side view of the PCM rotating wheel of FIG. 3C along A-A.
Figure 3F:
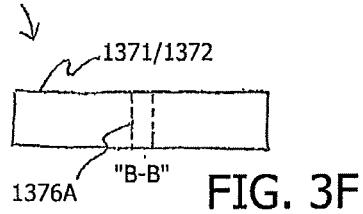
FIG. 3F is a side view of the PCM rotating wheel of FIG. 3C along B-B.

Referring now to FIGS. 3B-3F, another embodiment of the inventive fixed-bed PCM pellet module is shown as a rotating wheel 1370. The rotating wheel 1370 may be used as shown in FIGS. 3B and 3C where the wheel 1370 is configured to resemble a stylish suspended ceiling. By rotating the wheel 180°, the PCM "ceiling" moves from inside to outside, thus allowing for rejection of the heat absorbed inside during the day to outside at night. As such, this embodiment goes beyond shifting peak cooling load to off-peak periods. It instead shifts the peak cooling load completely to natural cooling phenomena outside—nighttime cool temperatures and wind. As a result, the net energy consumption for both heating and cooling is significantly reduced.

The installed configuration of the PCM rotating wheel 1370 is shown in a typical apartment. FIGS. 3B and 3C show the installation at day and night, wherein the only difference is that the PCM wheel 1370 has been rotated 180°. The elements of the PCM rotating wheel 1370 are presented in the same drawing.

The rotating wheel 1370 may be constructed of a wire mesh as described previously herein for fixed-bed PCM pellet modules (e.g., FIG. 2). Alternatively, the PCM wheel 1370 may be constructed of an extruded plastic sheet/profile such as PVC, polycarbonate, acrylonitrile-styrene-butyl acrylate, and other UV-resistant thermoplastic compounds. In this mode of PCM wheel construction, the void space in the fixed-bed of pellets therein may be filled with a metal powder, graphite, or another thermal conductivity improver.

The PCM wheel 1370 includes a back inert compartment 1371 and a front PCM pellet compartment 1372 separated by a divider 1373. The inert compartment 1371 acts to balance the weight of the PCM compartment 1372 and ensure proper wheel rotation. However, in another embodiment, a lower cost and equally effective mode of the invention embodiment is a "half wheel" with only the PCM compartment 1372 and no inert compartment 1371. The divider 1373 has the same width and length as the wheel's width and diameter.

The divider 1373 resembles a "cut out" of a wall placed along the diameter of the wheel 1370. As such, the thickness, barrier properties, and insulation features of the divider 1373 are preferably similar to that of the apartment wall. In one embodiment, the divider 1373 is built of 2"×4" lumber and oriented strand board (OSB) with extruded PVC sheet nailed to the front and back (i.e., the parts of the divider in direct contact with the PCM pellet and inert in compartments 1372 and 1371). The center cavity (between front and back OSB) is preferably filled with fiberglass insulation or similar material.

The wheel 1370 is installed in an apartment wall opening 1374 of the same length/width as the diameter/width of the PCM rotating wheel 1370, plus a few mm allowance for clearance and thermal expansion of the wheel 1370. In one embodiment, the wall wherein the PCM is installed preferably faces south or west (the side exposed to most solar radiation in the northern hemisphere). However, it should be understood by one of ordinary skill in the art that the wheel 1370 may be installed in any location in the apartment so long as the wheel 1370 functions in accordance with the present disclosure as described herein. As such, the PCM wheel 1370 has a diameter that is preferably between 60% and 90% of the width of the wall where it is installed. A shaft 1376 is placed in the wheel hole 1376A to rotate the wheel 1370 freely along a vertical axis parallel to the apartment wall. Although the weight of the wheel 1370 may be light enough that it can be rotated by hand with the assistance of a long hanging hooked rod (similar to some curtains), in one embodiment, the shaft 1376 is attached to an electrical drive and gear assembly that provides 180° turn upon touch-button actuation.

A seal 1378 placed around the clearance between the wall opening 1374 and the wheel 1370 prevents flow of air and moisture between inside and outside the apartment. The seal 1378 may be a system including rubber, graphite, or similar flexible materials that provide good sealing properties while not interfering with the rotation of the wheel 1370.

During daytime, with the wheel compartment 1371 rotated outside, the compartment 1372 containing PCM is positioned inside. Heat 1375 taken up by indoor air is removed by the PCM in compartment 1372 as it undergoes phase transition at a PCM melt point in the 21° C. to 25° C. range, keeping the inside space 1380 of the apartment cool on a hot day.

After sundown, when outside temperatures drop, the PCM wheel 1370 is rotated 180°, thus moving compartment 1371 inside and the PCM compartment 1372 outside. The night cold and wind outside removes the stored indoor heat 1375 from the PCM to an outside space 1382, and effectively storing the cold by re-freezing the PCM. The next day, the PCM compartment 1372 is rotated back inside to cool the inside space 1380.

In winter, the PCM compartment 1372 is rotated outside during the daytime to store the radiated solar energy for recovery during nighttime.

Although a rotating wheel 1370, positioned as a "decorative ceiling" is shown in FIGS. 3B and 3C and described above, other PCM modules may be positioned as different architectural elements having said "rotating" feature. For example, a wall or roof segment comprising rotating shafts, a side containing PCM, and the other side of a wall/roof material may be used to achieve the same advantages provided by the rotating wheel PCM embodiment. Such walls/roofs would be similar to highway billboards that cycle between images.

In other embodiments, fixed-bed PCM pellet panels can be installed in the attic or other locations within the envelope surrounding the residential space. When convection is poor (e.g., there is no attic fan), the PCM panel is preferably made of gypsum boards or PVC sheet instead of wire mesh. In such PCM panels, a metal powder, graphite powder/fiber, or other thermal conductivity improvers may be introduced within the packed bed of pellets. As a component of the building envelope, the PCM panel may be incorporated in the insulation system. When placed outside the residential space, the temperature regulating ("natural thermostat") feature of the PCM is not the basis for specifying the PCM melt point. In other words, the PCM phase transition temperature need not lie within the comfort range of 21-26° C. Instead, the phase transition temperature selected is one that lies within daily temperature variations during the months when most energy is consumed for cooling and heating. For example, in the South Atlantic Region of the U.S. (i.e., Virginia, the Carolinas, and Georgia) during the months requiring cooling (May-September), the nighttime temperature is 25° C. (77° F.) or lower, and the daytime temperature is 27° C. (81° F.) or higher. Therefore, a PCM with a phase transition temperature in the 25-27° C. range is expected to re-freeze naturally every night (without use of air conditioning) and re-melt every day during this period. By placing this type of PCM in the building envelope, the heat stored in the hot day is released mainly to the outside at night. As such, building envelopes containing such PCM reduce the heat gain by the residential space during the warm months requiring cooling. In months requiring heating (November-March), the daytime temperature is 13° C. (55° F.) or higher, and nights are 11° C. (52° F.) or lower. Therefore, a PCM with a phase transition temperature of 11-13° C. will re-melt naturally during winter days and stores the latent heat for release as it re-freezes in the evening. A building envelope containing such a PCM thus reduces heat loss from the residential space during winter. The embodiment of the disclosure, a fixed-bed pellet module for placement in the attic of a building in the South Atlantic Region, contains two types of plastic PCM pellets: one containing an organic PCM with a melt point of about 26° C. (e.g., paraffin with 90+% octadecane), and the other containing organic PCM with a melt point of about 12° C. (e.g., a $C_{14}$-$C_{16}$ paraffin composition).

Figures 4A, 4B:
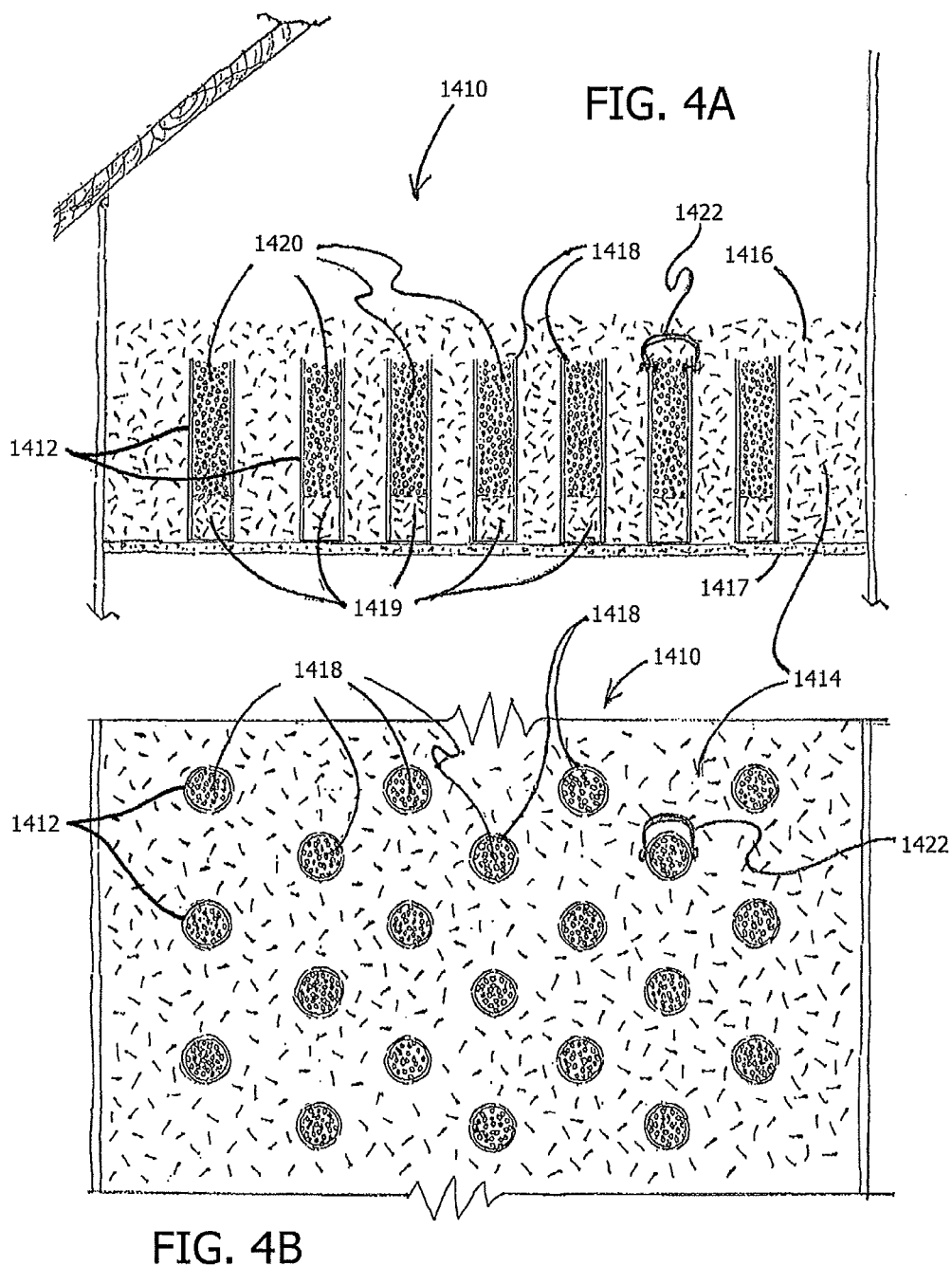
FIG. 4A is one embodiment of an attic insulation system incorporating fixed-bed PCM pellet modules.
FIG. 4B is a top view of the attic insulation system of FIG. 4A.

The fixed-bed PCM pellet module may also be cylindrical, and sized for use as portable "heat traps" or "cold traps" for easy installation within building envelopes. FIG. 4A shows an attic insulation system 1410 including such fixed-bed PCM pellet modules 1412 within the main attic insulation 1414 and top insulation 1416. The PCM pellet modules 1412 include a PVC pipe segment 1418, a bottom insulation layer 1419, and a PCM pellet packing section 1420. The void space in the PCM pellet packing section 1420 may optionally be completely or partially filled with metal powder, graphite, or another high thermal conductivity substance to improve conductive heat transfer within the fixed-bed PCM pellet module 1412. The PVC pipe segment 1418 may be a 1 inch to 8 inch Schedule 40 pipe, capped in the bottom. In some modes of this embodiment, a top cap is also provided to prevent PCM pellet spillage during handling. One embodiment of PVC pipe diameters for this embodiment is in the 3 inch to 6 inch range. The length of the pipe segment depends primarily on the peak heat load and solar irradiance, and corresponding total PCM and insulation requirement. In most cases, the pipe length is in the 6 inch to 36 inch range. Depending on the length and diameter combination, a handle 1422 may be added to help carry and install the fixed-bed PCM pellet modules 1412. The bottom insulation in the cylindrical module is preferably cut from a sheet of fiber-glass insulation and has a thickness of about 2 inches to 18 inches, preferably in the 3 inch to 8 inch range.

FIG. 4B provides a top view of the attic insulation system 1410 showing a placement of the modules 1412 within insulation 1414, and before adding the top insulation layer 1416. In one embodiment, the PCM pellet modules 1412 are installed in a hexagonal matrix, as shown in FIG. 4B before insulation 1416 is applied. Insulation 1414 is preferably a blown insulation or another form of insulation that ensures all gaps between the PCM pellet modules 1412 are effectively filled. After the insulation 1414 reaches the top of the PCM modules 1412, the top insulation 1416 is added. Insulation 1416 may be the same type as insulation 1414. In one embodiment, blown cellulose is used as the main insulation 1414 and fiber glass sheet insulation is used as the top insulation 1416. In one embodiment, the thickness of the top insulation layer is in the range of 3 inches to 18 inches; in another embodiment, it is in the 6 inch to 12 inch range.

The fixed-bed PCM pellet modules 1412 for attic insulation systems may contain pellets with a PCM melt point in the 25° C. to 32° C. range, and/or pellets with a PCM melt point from 10° C. to 15° C., for effective heat and cold storage, respectively, in most climate zones.

Another PCM-enhanced insulation system for attics involves blending the plastic PCM pellets of this invention with a blown insulation such as cellulose. The PCM pellet content of the mix may be between 10 wt % and 50 wt %, preferably between 20 wt % and 40 wt % (weight of PCM pellets per weight of PCM-enhanced insulation system). In one embodiment, the insulation is blown uniformly on the attic floor to provide an insulation thickness between 4 inches and 42 inches; in another embodiment, the insulation thickness is between 6 inches and 36 inches. Due to the size of the PCM pellets and the density difference between these and the blown insulation, a natural segregation occurs within the PCM-enhanced insulation. The segregated profile includes a higher concentration of PCM pellets in the bottom half of the insulation than the top half of the insulation. Heat transfer modeling studies have surprisingly shown that such a non-uniform distribution (i.e., more in the bottom, less in the top) is indeed preferable to a uniform PCM distribution within the attic insulation, providing greater overall energy savings. The segregated profile includes 20 wt % to 50 wt % pellet concentration in the bottom half, and 0 wt % to 20 wt % in the top half of the insulation.

The PCM pellets of this disclosure are also well-suited for use in novel cooling/heating systems, including a fan and fluidized bed (or "fluid-bed" for short) of these PCM particles. Because of the relatively high heat transfer coefficient between the fluidizing gas and the fluidized particles (typically in the 150-300 W/m²-K or 26-52 Btu/hr-ft²-° F. range), such systems can be particularly effective in utilizing the latent heat storage capacity of the PCM within the available hours for loading and unloading the heat each day.

Figure 5A:
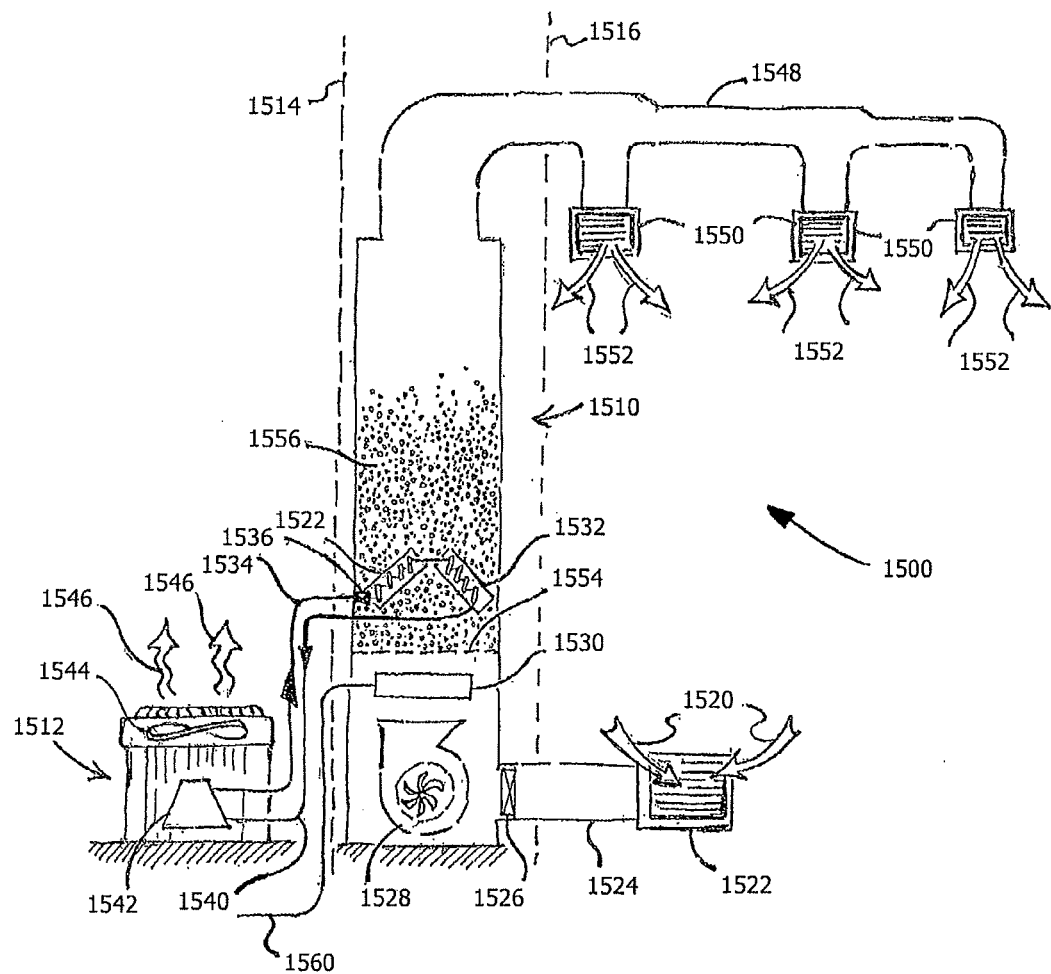
FIG. 5A is a central air conditioning system that shifts cooling load to off-peak electricity.

An embodiment of a central Heat, Ventilation, and Air Conditioning (HVAC) system using a fluid-bed PCM system, well-suited for retrofit projects, is provided in FIG. 5A. Referring to FIG. 5A, a typical split-system HVAC system 1500 is shown, including a condenser unit 1512 and an air handler unit 1510, with the condenser unit 1512 typically outside the building. The central air conditioner is thus separated from the living space via walls 1514 and 1516. The indoor air 1520 enters a fan suction duct 1524 through the register 1522 (also referred to as "grill"). The indoor air 1520 is optionally treated through air filter 1526 before entering the air handler 1510 where it is pressurized through a blower 1528. Depending on the circulation rate, the blower 1528 typically provides between 0.1 and 10 inches of water column pressure. The discharge air from the blower 1528 may be heated through a heater 1530 or cold coils 1532, depending on the season. A compressed refrigerant 1534 enters the cold coils 1532 through an expansion valve 1536. After heat exchange with the fan discharge air, the refrigerant is directed to the outside condenser unit 1512 through a refrigerant return line 1540. Therein, the heat of compression 1546 from pressurizing the refrigerant in compressor 1542 is driven off by a fan 1544. With heat thus rejected, the cool air 1552 is supplied to indoor space through an air handler outlet duct 1548 and registers 1550.

In this embodiment of the inventive fluid-bed PCM cooling system, the air handler 1510 is retrofitted to include a fluidization plate 1554 and PCM particles 1556 added therein. The fluidization plate 1554 is preferably a plate made of steel and having holes drilled 2 mm to 20 mm apart in a grid pattern. The fluidization plate may be attached to the walls of the air handler unit 1510 (e.g., via welding) to support the weight of the PCM particles 1556. The holes of the fluidization plate 1554 are smaller than the size of the particles such that, with the blower 1528 turned off, the PCM particles 1556 do not fall through, or plug the grid holes. Of course, various other fluidization plate constructions and designs are described in the literature and known to those skilled in the art. It will also be clear to those skilled in the art that for retrofit projects, modifications to the air handler unit may be necessary; for example, the cross-sectional area may need to be modified to operate above the minimum fluidization velocity for a given blower capacity. The preferred fluidization velocity is 5% to 80% higher than the minimum fluidization velocity. The minimum fluidization velocity, in turn, depends on the physical properties of the PCM pellets (i.e., particle size, spherecity, and density) and the potential scope of retrofit to the air handler unit will also be different. The PCM particles 1556 are preferably the coated PCM pellets of this disclosure, having a phase transition temperature between 18° C. and 24° C., and a latent heat between 60 and 160 J/g.

The air conditioning unit of FIG. 5A is operated at night using off-peak electricity. Depending on the refrigerant, the cooling coil 1532 may approach temperatures of about −40° C. The combination of a high thermal "driving force" (difference between coil and bed temperatures) and high heat transfer coefficient in the fluidized mode, allows for rapid removal of heat from the PCM particles via off-peak air conditioning. During the day, including summer afternoon peak hours, the high-energy consuming compressor 1542 stays off while indoor air 1520 is circulated through the retrofitted air handler 1510, wherein the air is cooled through the fluidized bed of PCM particles 1556. Again, high heat transfer coefficients allow for efficient cooling of the air at the PCM phase transition temperature, between 18° C. (64° F.) and 24° C. (75° F.) depending on the PCM, thus supplying the air 1552 at this temperature range. The fluid-bed central cooler "runs out of stored cold" when all organic PCM within the fluidized particles has melted. The air conditioner's condenser unit 1512 will then come on to recharge the PCM particles 1556 during off-peak hours.

One of the advantages of the central cold storing and supply system 1500 of this embodiment, is that it allows for easy addition and removal of PCM particles, thus allowing for optimization of the system (i.e., to provide enough heat storage capacity such that the evaporator unit 1512 does not turn on during peak load periods). It should also be noted that the regular thermostat controls of the central air conditioner need not be changed. The thermostat is simply programmed to reduce the set point to a low value below the phase transition temperature of the PCM (i.e., 68° F. or 20° C. for a 22° C. freezing PCM) at off-peak hours (i.e., 11 p.m. to 5 a.m.), and then raise the set point to a value on the high end of the comfort range (i.e., 24° C. or 76° F.) to ensure the condenser unit (air conditioner compressor) stays off during the peak hours unless the stored cold in the PCM runs out.

The central fluid-bed latent heat storage system of the FIG. 5A embodiment is also useful for storing solar energy during cold seasons. Referring again to FIG. 5A, the heater 1530 is an electrical air heater supplied by electricity 1560 from a solar panel (not shown). During the day, the solar electricity is used to provide supplemental heat while melting the PCM in the fluidized pellets. This heat is then recovered at night as air 1520 continues to circulate through the fluid-bed of PCM and the melt therein re-freezes at the PCM phase transition temperature. The indoor air 1520 is thus prevented from dropping below this temperature until all PCM re-freezes.

Although a central HVAC system was described in the FIG. 5A embodiment, it would be obvious to those of ordinary skill in the art that the same elements may be combined to provide a non-central ductless fluid-bed cooler/heater. The ductless unit may comprise a fan and fluidized bed chamber for storing the off-peak cold (from an air conditioner refrigerant condenser unit or nighttime cool air) and using it the next day as the PCM in fluidized particles melt and remove the heat from a room or apartment. Depending on the number of doors, windows, and level of insulation, a typical living room may require 60-150 kg of PCM particles having a latent heat storage value of 80-100 J/g. Thus, the fan and fluidization chamber are sized for fluidization of 60-150 kg PCM particles. This type of a unit would be simple to install with little or no need to retrofit the building components.

Figure 5B:
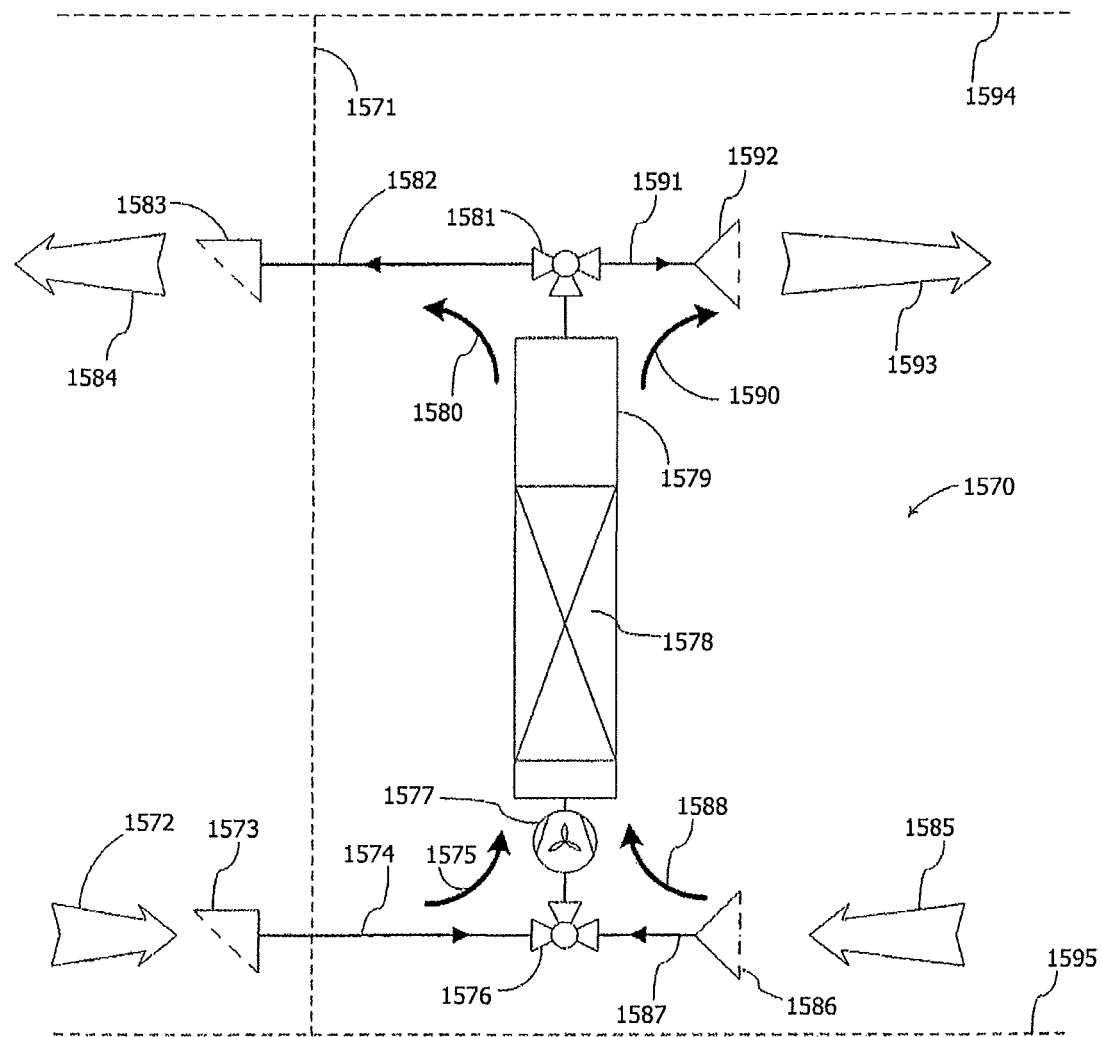
FIG. 5B is a PCM cooling system for providing localized cooling from stored nighttime cold.

The elements required for a local cooling PCM system 1570 are provided in FIG. 5B for climates that are characterized by hot summer days and cool nights (temperatures at or below around 21° C. or 70° F.). The PCM-based local cooling system 1570 provides daytime cooling to a room or small apartment using stored cold from the previous night. The air cooler 1570 is in a building separated from outside by walls 1571 and supported by a floor 1595 or ceiling 1594 (supports/stands not shown). The air cooler system 1570 comprises a chamber 1579 containing a bed 1578 of PCM. The chamber 1579 may be cylindrical (circular base) or rectangular (square or rectangle base and four sides). The bed 1578 may be a fixed-bed or a fluidized-bed of PCM pellets, the pellets having a PCM melt point in the 21° C. to 25° C. range. The bed 1578 may also be a chamber insert assembly made of injection molded or extruded PCM plastic articles such as finned plaques, tubes, and sheets as described later in this disclosure. The air cooler 1570 is further equipped with a 3-way valve 1576 to allow the air from either outside or inside the building to come into contact with the PCM bed 1578 through a fan 1577. The pressure drop through PCM bed 1578 is preferably less than the fan 1577 discharge pressures at design air flow.

Starting with PCM in melt phase, night air outside having a temperature below 20° C. is used to freeze the PCM bed 1578. The outside air enters the cooler 1570 through an intake screen 1573 to ensure that no dust or other air-borne contaminants enter the cooler 1570. The cool night air enters the building through plenum or conduit 1574. With the 3-way valve in position 1575, the air contacts the PCM bed 1578 and freezes the PCM therein. If the outside air is humid or too cold, it is rejected through the outlet 3-way valve 1581 in position 1580. This allows air used to freeze the PCM to exit outside through conduit 1582 and outlet 1583. However, if the air is dry and not too cold, the air is allowed to ventilate the indoor space through position 1590 on the outlet 3-way valve 1581.

During the day as it starts to get warm outside, 3-way valves 1576 and 1581 are switched to positions 1588 and 1590 to allow for circulation of indoor air. The heat building up in the indoor space is thus removed by having warming air 1585 enter the PCM bed 1578 through a register 1586 and a plenum or conduit 1587 via circulating fan 1577. The heat in air 1585 is used to melt the PCM in bed 1578, thus providing a cooled air stream 1593 that blows through conduit or plenum 1591 and supply register 1592. In one embodiment, the amount of PCM in the bed 1578 is preferably in the 60-150 kg range (for PCM latent heat storage values of 80-100 J/g), enough to remove the daytime heat gain within the room. The PCM can then be regenerated (i.e., unloaded, refrozen, or "recharged") by use of outside cool air during the night, as described earlier in the description of this embodiment.

It should be noted that the valve positions may be operated automatically through a control system that measures inside and outside temperatures, thus requiring very little attention by the occupants. Such localized coolers may be configured in attractive designs such that their installation in typical homes is motivated not only by energy conservation but also by style. The PCM-based air cooler 1570 may thus be built of cabinetry wood types for a traditional décor, or of engineered plastics like Lexan® for a stylish modern look.

The plastic PCM compounds of this invention may be injection molded into various latent heat storage articles. Injection molding methods and apparatus, including methods and apparatus for production of articles such as tiles, are described in the prior art, including U.S. Pat. Nos. 5,787,654 and 7,299,592. Due to the lubricating effect of the organic PCM present in the compound, no mold release agent is needed for this application, making this a surprisingly efficient plastic compound to injection mold.

Since the molded PCM compound has a relatively low thermal conductivity (typically in the 0.02 to 0.4 W/m-K range), a small wall thickness is desired to achieve efficient heat transfer rates between the PCM article and the air. Articles with wall thicknesses of 0.2 mm to 10 mm are thus preferred.

An embodiment of this aspect of the disclosure is an injection molded finned ceiling tile for latent heat storage, provided in FIGS. 6A-6C. Therein, the finned PCM tile 1612/1612A and a standard suspended ceiling tile 1616 are attached. The reference 1612A is the "worm's eye" view while 1612 is the same finned tile at eye level, shown from two different sides. The finned tile 1612 comprises a base 1614, a hole 1623, and fins 1620. The base 1614 and the fins 1620 are preferably produced from the same plastic mold.

The mold for the finned tile 1612 is a hardened steel construction (or alternatively pre-hardened steel, aluminum, and/or beryllium-copper alloy). The plastic PCM compound is preferably introduced into the injection molding machine hopper in the pellet form, either uncoated or coated with a powder coating as described previously in this disclosure. In addition to the hopper, the injection molding machine consists of an injection ram or a screw-type plunger, and a heating unit. The pellets are melted in the 200-400° F. range to provide the shot for injection into the mold. After being molded and cooled, the finned tile object described herein is discharged from the mold and coated.

In a preferred embodiment, the coating is an oil-absorbing powder, such as calcium silicate. In a preferred aspect of the disclosure, the injection molded article is coated by dipping it into an open top container wherein calcium silicate, having average particle size between 0.5 and 50 microns, preferably between 1 and 10 microns, is fluidized with a regulated flow of compressed air. The compressed air is preferably introduced into the bottom of the dry coating container through a sintered metal nozzle/sparger.

In other embodiments, injection molded PCM plastic articles, such as the finned tile, may be coated with ethyl cellulose and PVDC latex using application methods known in the art such as dip coating or spray coating. In dip coating, the object is immersed in the latex or other liquid-based coating, allowed to drain for about 30 seconds, and then dried for several minutes in a convection oven at 50-60° C. Spray coating of molded articles requires more sophisticated machines. In such coating processes, the article is rotated as it is dried under radiant heat at 50-60° C. As with the coated pellets, a coating layer of 20 to 400 microns, preferably applied as two layers having a thickness of 10 to 200 microns each, will substantially eliminate organic PCM seepage from the article and—in the case of halogenated polymers like PVDC and inorganic coating media like calcium silicate—impart ignition resistance to the latent heat storage article.

In yet other embodiments, the injection molded thermal storage article is formed with the sandwich molding process thereby encapsulating the PCM compound within a second plastic, wherein the organic PCM has limited solubility. For paraffins, polyethylene terephthalate (PET) and polyvinylchloride (PVC) are two such plastics. With sandwich molding, the coating is not required.

The finned PCM tile 1612 is attached to a conventional ceiling tile 1616 by drilling a hole 1618 through the conventional tile 1616. The conventional tile 1616 may be of any of the material of construction used for suspended ceiling applications, including wood, metal, plastic, and mineral fibers. The suspended ceiling application is commonly used in office buildings wherein the tiles are supported by a grid-work of metal channels hanging from the floor above. The ceiling tiles thus hide the ductwork and electricals between the floors and provide some noise and thermal insulation. The conventional ceiling tile 1616 is supported through T-bar 1617.

The fins 1620 are between 0.4 and 4 mm thick, preferably 2-3 mm thick. The thickness is selected to provide maximum heat transfer rate while providing a high latent thermal storage for each tile. The height of the fins may be selected to maximize the amount of PCM per tile, while maintaining an attractive, non-obtrusive appearance. For conventional ceiling tiles 1616 having dimensions of 24"×24", the attached finned tile 1612 preferably has a base 1614 dimension of 16"×16" to 23"×23". In this case, the fins 1620 are preferably between 6" and 24" long.

The conventional tile 1616 is drilled in the center to make a hole 1618. The finned tile 1612 is then attached to the conventional tile 1616 through the hole 1618, using a bolt 1622 and a nut 1621. This simple building retrofit allows passive storage of off-peak air conditioning in the finned tiles containing PCM, such that the indoor temperature can be maintained around the PCM phase transition temperature (preferably 21-23° C. for this ceiling tile application) with reduced use of peak load electricity.

Other latent thermal storage articles made by injection molding (and optional coating) of plastic PCM compounds include louvers, HVAC duct inserts, ceiling fixtures, and roof shingles. Finned parallel plates or louver inserts are also well-suited for use as the "PCM bed" 1578 in the FIG. 5B embodiment of localized air cooler 1570.

Injection molded PCM louvers can be in the form of conventional blinds, shutters, or as part of ceiling or portable fans. In some embodiments, the injection molded louvers can be integrated with the guards of the cooling fan. In climates of low humidity where windows can be kept open, latent thermal storage louvers of this invention may be engineered for storing the cold from night and wind, and maintaining the building cool as warm daytime air flows past the louvers to recover the stored cold therein as the PCM melts. PCMs having a phase transition temperature in the 18-23° C. range are well-suited for these applications.

For HVAC duct inserts, the same type of finned object disclosed in FIGS. 6A-6C for use as ceiling tiles may be used. When used as cooling duct inserts, such finned PCM objects would preferably have a phase transition temperature in the 18-23° C. range. Placed in the duct in a configuration that allows for maximum cross-sectional area, such injection molded plastic PCM inserts store the off-peak cold (from running the air conditioning at night), thus minimizing use of peak load air conditioning during the day, with just the fan running.

Extrusion is commonly used to make plastic sheets/profiles. Both single-screw and twin-screw extruders are used to make plastic sheets such as PVC siding. The PCM plastic compounding process of this disclosure, presented in FIG. 1B, may be used to make extruded sheets directly from a polymer and an organic PCM, and any of the additives disclosed previously herein. Referring to FIG. 1B, the extruder 1100 may be equipped with a die for sheet/profiles. The PCM sheet is preferably from about 0.5 mm to about 5 mm in diameter, with widths ranging from 10 cm to 2 m. The length of the sheets largely depends on the application, but most typically is between 1 m and 10 m. The sheet/profile may be coated with a dry powder having oil-absorbent properties, as previously described herein. It can also be coated with the polymer coatings, such as PVDC (optionally as a second coating over a first polymer coating), to provide fire resistance properties and prevent seepage of organic PCM therein. In one embodiment, the PCM sheet will be produced via a co-extrusion process wherein at least another layer of a plastic (a substrate or a cap stock) is provided from another extruder through a common co-extrusion die. In one embodiment, the non-PCM plastic is PVC which, like other halogenated polymers, has ignition resistance properties. The plastic PCM sheet may be used in a number of latent heat storage applications, mainly as building envelopes.

One embodiment of a PCM plastic sheet is a co-extruded PCM/PVC plastic for use as vinyl siding having latent heat storage properties. As in other building envelope PCM plastic embodiments described herein, for reducing heat gain during warm months such PCM will, in one embodiment, have a melting point in the 25° C. to 30° C. range.

One embodiment of a PCM plastic sheet is as a separator between layers of insulation. A PCM plastic sheet, or a plurality of PCM plastic sheets, may be placed within layers of fiberglass, cellulose, and/or extruded polystyrene insulation. This insulation/thermal storage system is particularly useful for walls and attics. The PCM plastic sheets for combining with wall and attic insulation typically have a phase transition temperature in the 25° C. to 30° C. range to reduce heat gain during warm months. PCM plastic sheets to reduce heat loss during cold months may also be produced by selecting the organic PCM having melting/freezing temperatures in the 10° C. to 15° C. range. A modification of this embodiment includes wall and attic insulation systems combining both winter and summer PCM sheets. For attic insulation, such a system may include (from bottom to top, or from residential place ceiling board to open space below roof): a layer of blown cellulose insulation, a layer of 25-30° C. PCM sheet, a layer of fiberglass insulation, a layer of 10-15° C. PCM sheet, and another layer of fiber glass insulation.

An alternate embodiment of the PCM plastic sheet is the PCM-enhanced wallboards. In other modes of this embodiment, the PCM plastic sheet (or a plurality of PCM sheets) is stapled or nailed to the backside of a gypsum wallboard or ceiling board before it is installed by nailing the wallboard or ceiling board to the wooden studs of the building. Since the wallboard/ceiling board is in direct contact with the conditioned air inside, and the wallboard/ceiling board itself does not have insulating properties, the PCM plastic sheet used as a backing, in one embodiment, has a PCM melt point in the 21° C. to 24° C. range. As such, the PCM sheet attached to the wallboard can store the cold from off-peak air-conditioning and allow for reduced use of peak load electricity for cooling.

Extruded PCM sheets may be used as components in construction of PCM-enhanced roof shingles. The extruded PCM sheet segments may be laminated to the backside of each shingle, or placed as a mid-layer within the shingle construction. Such PCM shingles are directed at reducing building heat gain during warm months. For maximum effectiveness, the PCM needs to have a higher freezing point than the temperature during the warmest nights of the year. For most regions, plastic PCM having a phase transition temperature in the range of from 26° C. to 34° C. is best-suited for shingle production. By storing the solar energy directed at the roof at PCM melting point (and releasing the heat to the atmosphere when the sun goes down), the PCM shingles maintain a lower average roof temperature than conventional shingle roofs during hot summer days. Building heat gain and corresponding cooling energy consumption are thus reduced.

Extruded PCM sheets may also be used as a roofing underlay. In such PCM-enhanced roofing systems, the PCM sheet may be applied as part of the leak barrier placed under conventional roof shingles. The hydrophobic nature of the paraffin/HDPE system makes these PCM compounds particularly well-suited for this purpose.

PCM-enhanced roofing is mainly designed to reduce building heat gain in the warm months. For maximum effectiveness, the PCM needs to have a higher freezing point than the temperature during the warmest nights of the year. For most regions, PCM having a phase transition temperature in the range of from 26° C. to 34° C. is best-suited for roofing (ensuring summertime daily phase change, while providing a lower peak temperature). Such PCM-enhanced roofing systems store the solar energy directed at the roof and release the heat to the atmosphere when the sun is down. Extruded PCM sheets may be used effectively as backing for various roofing systems including asphalt shingles, aluminum shingles, white/reflective "cool roofs," and "green roofs," thus achieving the objectives of the inventive embodiment.

Performance of green roofs—flat roofs with vegetation planted to reduce heat gain by the building—may be enhanced by PCM plastic compounds in different ways. One method of enhancing such a roof with PCM is by installing PCM sheets as part of the waterproof repellant layer of the green roof (i.e., under the vegetation growing medium). Alternatively, PCM pellets may be mixed in with the vegetation growing medium (e.g., potting soil). A PCM pellet concentration of about 5 wt % to 30 wt % stores some of the heat absorbed by the green roof during the day for slow release at night, thus lowering building heat gain while reducing temperature swings in the growing medium and improving growing conditions therein.

In addition to sheets, tubes and pipes can also be fabricated by extrusion of the plastic PCM compound through a tube/pipe die and appropriate cooling/handling equipment downstream. Methods and apparatus for converting plastic compounds to extruded tubes are described in the prior art, including U.S. Pat. Nos. 3,580,037, 3,992,913, and 4,201,071. PCM tubes with the diameter of a plastic straw (a common article manufactured by tube extrusion) may be produced via methods known in the prior art. When compounded with color concentrates and extruded, PCM tubes having attractive colors and particularly suitable for use as curtains and wall/ceiling fixtures may be fabricated. In general, PCM tubes having thicknesses in the 0.5 mm to 3 mm range, outside diameters in the 5 mm to 50 mm range, and lengths in the 6 inch to 96 inch range, are well-suited for the articles disclosed herein.

These tubes may be coated with an oil-absorbing coating powder such as calcium silicate, or with a polymer coating system comprising PVDC latex and preferably an undercoat, as previously described herein. Alternatively, the PCM tubes/pipes may be produced as co-extruded pipes using a second plastic compound that is insoluble in the organic PCM, and is preferably ignition-resistant.

In embodiments of the latent thermal storage curtains, the tubes may be horizontally arranged to make a rolling sheet of tubes, similar to "bamboo curtains." In alternate embodiments, the PCM plastic tubes may be chopped into small (1 cm to 20 cm) pieces, strung along with colorful beads, and hung vertically to make a "bead curtain", having latent heat storage properties. Since these curtains hang indoors, they preferably have a PCM melting point in the 21° C. to 23° C. range to store off-peak cooling and reduce use of air conditioning during peak hours.

Figure 7A:
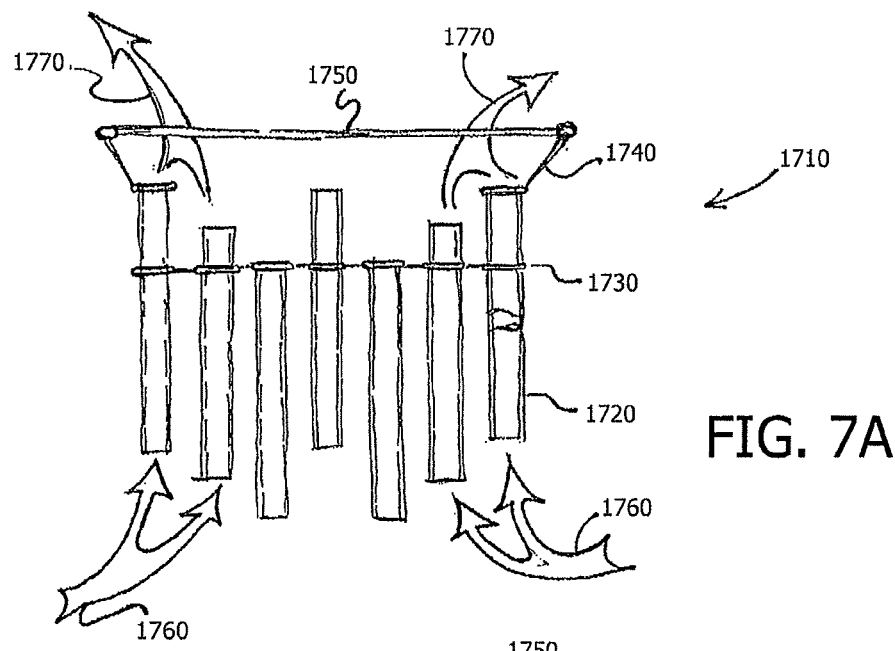
FIG. 7A is a side view of a latent heat storage ceiling fixture made from a plurality of extruded tubes of the plastic PCM.
Figure 7B:
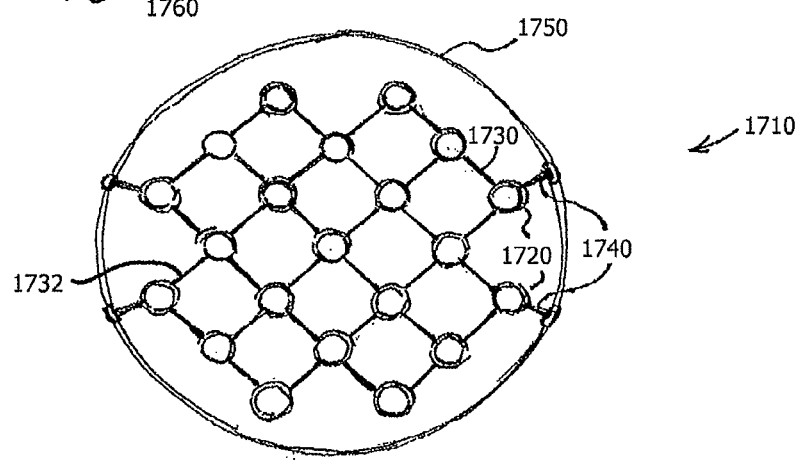
FIG. 7B is a top view of the plurality of extruded tubes of FIG. 7A.

The PCM tubes may also be configured as ceiling or wall fixtures. Referring to FIGS. 7A and 7B, a ceiling fixture 1710 is shown having a plurality of plastic PCM tubes 1720, arranged in an attractive configuration resembling a chandelier or elegant light fixture. The plurality of PCM tubes 1720 are held together by a wire web 1730, including rings for each tube and elements attaching these rings together to form a tube assembly 1732. The tube assembly 1732 is supported by a larger metal ring 1750 through connecting elements 1740. The wire web 1730 and the ring 1750 may be of a metal or plastic construction, such as brass or pewter. This PCM ceiling fixture 1710 may be hung from the ceiling by the ring 1750. When allowed to cool via off-peak air conditioning, this PCM ceiling fixture 1710 uses the stored cold to reduce the peak load electricity demand for daytime cooling. Through natural convection (or forced convection when used in rooms with a fan), warming air 1760 flows through and around the tubes 1720, melting the PCM and releasing the cold stored therein. The cooled air 1770 leaves the tubes and helps keep the room cool without need for peak load air conditioning.

A fluid-bed air cooler with PCM particles was described previously in this disclosure. In a fluidized bed, the temperature of the air exiting the bed is essentially the same as the bed. With the bed temperature at the PCM melting point, the air exiting the bed will stay at that temperature until the PCM therein has melted. By combining such a fluid-bed cooler with a "PCM recharger" or "regenerator" (a unit that refreezes and unloads the stored latent heat in the PCM), cool air may be delivered continuously. Evaporative cooling using water is an efficient way to achieve such a continuous PCM recharge.

Figure 8:
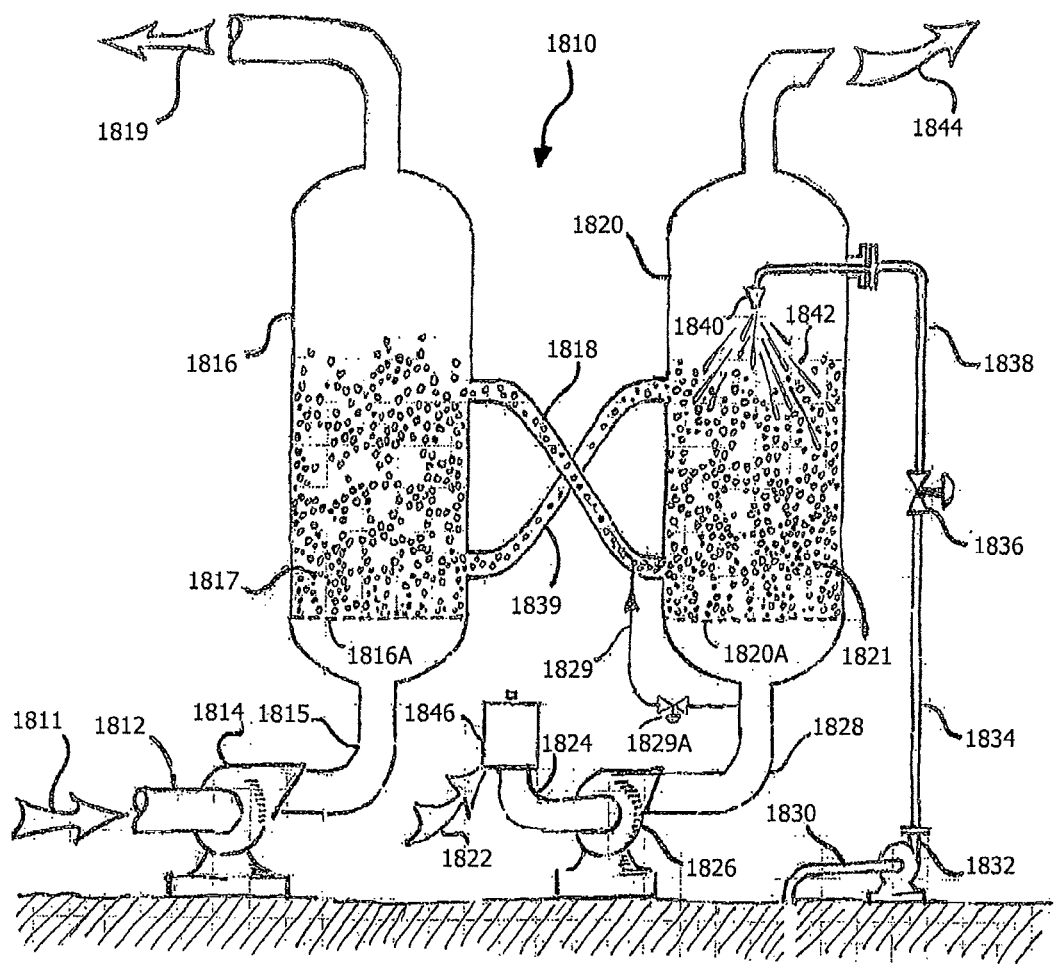
FIG. 8 is a refrigerant-free air conditioning system, including a continuous fluidized bed air cooler.

FIG. 8 shows such a refrigerant-free air conditioning system 1810. An air stream 1811 leaves the building through existing duct work and enters a blower 1814 through inlet duct 1812. The blower 1814 pressurizes the air to deliver a fluid-bed air cooler inlet air 1815 pressure of 0.5 to 15 inches of water column. The air 1815 is distributed through a fluidization plate 1816A before entering fluid-bed air cooler 1816. The particles containing PCM, preferably the PCM pellets described in this disclosure, are fluidized as a fluid-bed 1817. The PCM melt point may be any value in the 10° C. to 24° C. range, preferably a value between 18° C. and 22° C., and 20° C. (68° F.) for this particular embodiment. As such, if the building air 1811 is at 24° C. (75° F.), the fluid-bed 1817 will cool the air as it operates at its melt point of 20° C., and provide a cooled air 1819 at about 20° C. The depth of fluidized bed of PCM particles 1817 is at least 200 mm, preferably between 500 mm and 3,000 mm. The actual PCM inventory in the system and air circulation rate depend on the building's size and daily heat gain.

The air cooler 1816 is fluidly connected to a PCM regenerator 1820. PCM regenerator 1820 uses outside air 1822 and sprayed water 1842 to fluidize and evaporatively cool the pellets therein. The flashed water vapor and heat removed from the PCM pellets are directly vented to the atmosphere as rejected heat 1844. Since PCM regenerator 1820 does not have the building cool air duct back pressure, it is at a lower pressure (by 0.5 to 5 inches of water column). As such, fluidized PCM particles 1817 flow through conduit 1839 to PCM regenerator 1820. A city water supply source 1830 is optionally pumped through a pump 1832 to provide a pressured water stream 1834. A control valve 1836 ensures that the proper flow of water is introduced to remove the molten PCM heat of fusion by corresponding water heat of evaporation. Because water has a very high heat of vaporization (2,257 J/g), the flow rate of water required is about $1/20^{th}$ of the PCM pellet circulation rate through the fluidized bed system. Typically, the PCM pellets as the fluid-bed 1817 leaving the air cooler, are at the PCM melting point (20° C. in this embodiment), and are cooled between 0° C. (when only latent heat is removed) and 10° C. (sub-cooled) below this value. In this embodiment, the pellets 1821 in PCM regenerator 1820 are about 19° C. That is about 1° C. below the melting point.

The cooling water 1838 is sprayed through a spray nozzle 1840 to form small droplets 1842 (preferably 1 micron to 1 mm) that vaporize upon contact with the pellets 1821, removing heat from the pellets 1821 and refreezing the PCM. The spray nozzle 1840 is preferably designed to atomize the water, forming droplets in the 1 micron to 100 micron range. Although the drawing shows the spray nozzle 1840 delivering the water spray 1842 from above the bed 1821, the water spray nozzle 1840 may also be applied from within the bed pointing up—resembling a fountain. Two-fluid nozzles, where some of the inlet air 1828 is co-injected with the water through the nozzle, provide good atomization and are well-suited for use as a spray nozzle 1840. The 2-fluid atomizing air may be supplied from an air compressor (not shown).

Water vaporization and corresponding evaporative cooling is promoted by the fluidization air 1828 supplied by a fan 1826. The air is outside air 1822 that is supplied through fan suction 1824. The suction may optionally be equipped with an air dryer and filter screen 1846. During the warm season, when the inventive refrigerant-free air conditioner system is used, the outside air 1822 is typically between 25° C. and 45° C., with relative humidity values in the 10% to 99% range. In some modes of the embodiment, the water spray nozzle 1840 is placed in an air fan discharge duct 1828 to provide an evaporatively cooled air to remove the heat of fusion from bed 1821. Fluidizing air 1828 is distributed through fluidization plate 1820A to provide the air to the pellet cooler 1820.

The discharge air 1844 rejects the heat and humidity from the air conditioning system of FIG. 8. If the water were to be injected directly into the air in order to cool the air by evaporative cooling, the level of humidity built up inside the building would become unacceptably high.

It should be noted that the pellets coated with polymers such as PVDC, as described earlier in this disclosure, have excellent moisture barrier properties. As such, presence of liquid water on the pellets is not a problem.

The regenerated PCM pellets 1821 are continuously transferred back to the air cooler through conduit 1818, via conveying air 1829. In some modes of operation, the conveying air 1829 is supplied from an air compressor (not shown). A valve 1829A controls the flow rate of the conveying air 1829 and, thus the PCM pellet circulation rate between the two fluid-bed vessels. Generally, the continuous refrigerant-free air conditioning system is controlled by PCM particle circulation rate (control valve 1829A) and PCM regenerator bed temperature (control valve 1836). The bed 1821 is controlled at 19° C., via spray water flow rate, and the cooled air 1819 temperature by the rate of circulation of these cold storing pellets to the air cooler 1816.

It would be recognized by those skilled in the art of chemical engineering that the two fluidization vessels shown in FIG. 8 can be combined as one structure, thus reducing the footprint of the system. This is analogous to combining a fluidized catalytic cracker's reactor and regenerator into one structure, as in the Kellogg Orthoflow units.

Example 1

Production of Organic PCM

Technical grade beef tallow and degummed soybean oil were hydrodeoxygenated in a fixed-bed pilot plant reactor to convert these triglycerides into a paraffinic hydrocarbon. The pilot plant reactor system was sized for 1 bbl/d liquid throughput. The methods described in U.S. Pat. Nos. 8,232,804 and 8,026,401 were followed. The liquid products included a clear paraffinic hydrocarbon and water. The paraffinic hydrocarbon was analyzed by GC and its weight percent composition was determined to be 1.0% tetradecane, 1.4% pentadecane, 17.0% hexadecane, 6.6% heptadecane, 71.5% octadecane, 1.1% eicosane, and 1.4% other hydrocarbons. The tallow-derived paraffin was then fractionated into an octadecane-rich bottoms fraction and a hexadecane-rich overhead fraction. A 2-inch I.D. pilot plant vacuum distillation column was used for this purpose. The column contained beds of Goodloe® knitted wire structured packing. The distillation was carried out at 1.5 psia vacuum with 450° F. bottom column (reboiler) temperature, and a reflux ratio of 2:1. The bottoms cut was analyzed and found to be octadecane of 91.2% purity, with heptadecane as its main impurity. The octadecane product was analyzed by a Differential Scanning calorimeter (DSC) and found to have a melt point onset temperature of 19° C., and peak temperature of 26° C. The heat of fusion was 214 J/g.

Example 2

Compounding and Pelletizing Plastic PCM

A 45 mm Theysohn co-rotating twin-screw extruder having a 40:1 L/D ratio, nine (9) controlled zones, and feed zone was used for PCM compounding. The extruder was set up to feed the compounded product into a Gala Industries underwater pelletizer, with a 10-hole die (5 holes plugged), and a 6-blade knife hub. PE161 HDPE pellets from PolyOne Corporation, and octadecane were fed to the extruder at a polymer/paraffin weight ratio of 30/70 to 35/65. A K-tron Belt-feeder W300 Gravimetic Feeder was used for the PE and a Mahr and a Zenith gear pump for introducing the octadecane in Zones 2 and Zone 5 (at about the same rate). The Zones 1 through 9 were at 450° F. to 320° F. The pelletizer water was maintained at 157-158° F.

The pellets formed were elongated particles (resembling rugby balls) with shorter dimension (diameter) of 1-2 mm, and longer dimension (length) of 2-5 mm. DSC analysis showed the pellets to have a latent heat storage capacity of 122 J/g, with a phase transition temperature of 26° C.

The pellets retained their form at temperatures substantially above the octadecane melting point. However, paraffin seeped to the surface at temperatures above the melting point. When cool pellets were held in the hand and allowed to warm for 5 minutes, the hand became oily.

Example 3

Seepage of Organic PCM from Plastic Pellets

To quantify paraffin seepage from the pellets, these were heated in an oven at 60° C. for an hour, and then removed and washed with hexane twice and then weighed. The heating and hexane wash cycle was repeated five additional times. The final weight was 95% of the original pellet weight, indicating that 4% of the plastic PCM compound (mainly paraffins) was extracted after five heat and wash cycles.

Example 4

Powder-Coated Plastic PCM Pellets

Figure 9:
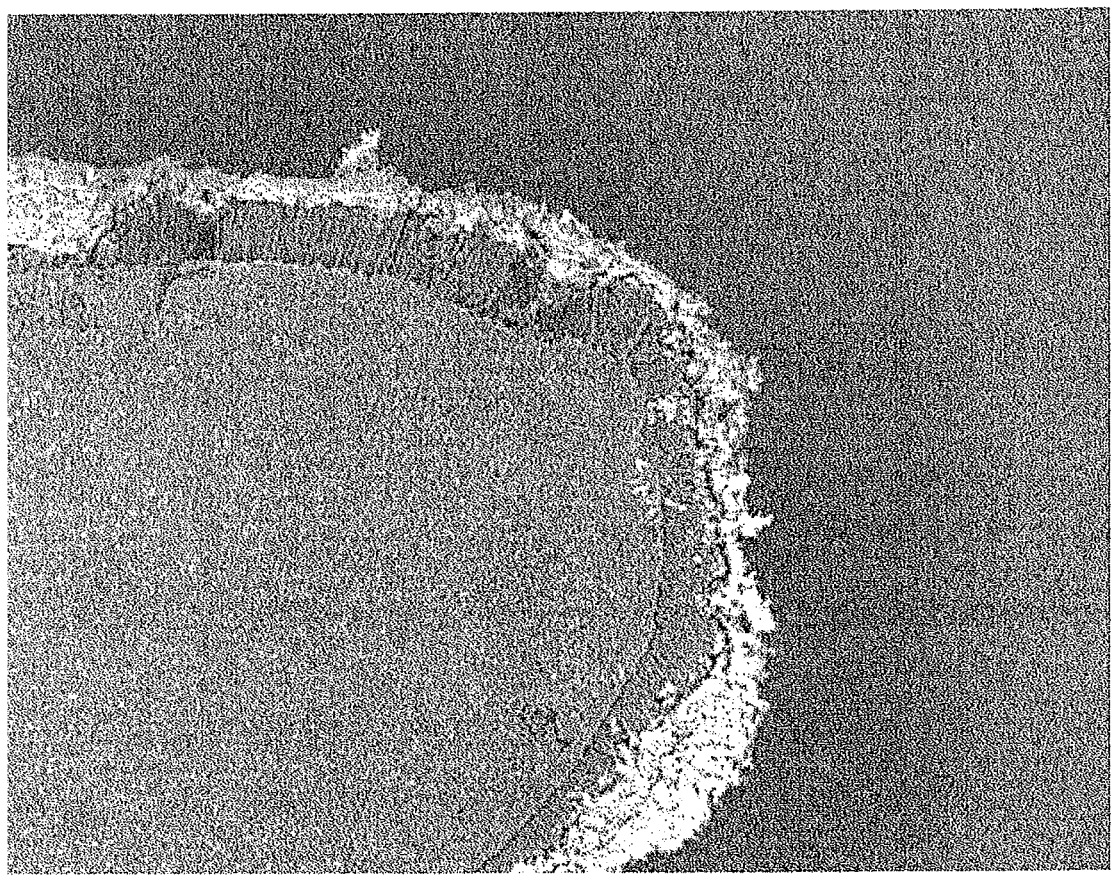
FIG. 9 is a scanning electron micrograph of a powder-coated pellet.

A twin-shell dry blender (also known as a V-blender) was loaded with 26 lbs. of the PCM pellets formed in Example 2. Next, 1.7 lbs. of calcium silicate powder (HUBERSORB 600 from Akrochem Corporation) was added to the V-blender (for a coating target of 6%). The calcium silicate powder had an average particle size of 6 micron with an oil-absorbing capacity of 475 cc/100 g. The BET surface area of the powder was 300 $m^2$/g. The V-blender was started at a rotation rate of 10 revolutions per minute. After 30 minutes of tumble mixing, the powder-coated PCM pellets were discharged in a polyethylene bag. The powder-coated pellets showed no paraffin seepage at temperatures above PCM melt point. When allowed to heat in the hand for 5 minutes, the hand remained dry (free of oil). Scanning Electron Micrograph (SEM) of the cross-section of a sliced coated pellet, presented in FIG. 9 with 100× magnification, showed complete pellet coverage. The coating resembled two layers: a 10-80 micron layer of free powder on top, and a 90-150 micron layer of oil-extended powder bound to the pellet surface. The latter appeared fibrous and distinct from both the free powder on top and the PCM compound underneath.

Example 5

Polymer-Coated Plastic PCM Pellets

A Wurster lab-scale fluidized bed coater was loaded with 100 g of the pellets formed in Example 2. A 10 wt % solution of ethyl cellulose (Ethocel™ 7 from Dow Chemical) in ethanol was prepared. The pellets were coated with this, using fluidizing air heated to 70° C. at 30-35 SCFM. The liquid pump rate was adjusted to maintain about 44° C. outlet air temperature. After applying about 2.3% coating weight (based on original weight of pellets) of this layer, the pump was switched to a PVDC latex (Daran® SL112 from Owensboro Specialty Polymers) with the flow rate adjusted to maintain the same outlet air temperature. The latex had a total solids content of 54% with average particle size of 100 nm. The PVDC latex flow was stopped after a 22% coating weight (dry basis, original pellet charge) was applied. The dry polymer-coated pellets were then discharged and found to be well-coated with no oily feel when allowed to warm in the hand for 5 minutes. The pellets were also subjected to the paraffin seepage and hexane extraction test of Example 3. No loss of plastic PCM weight was observed after 5 cycles of heating to 60° C. and double-washing with hexane. SEM images also confirmed complete coverage provided by two distinct coating layers.

Figure 10:
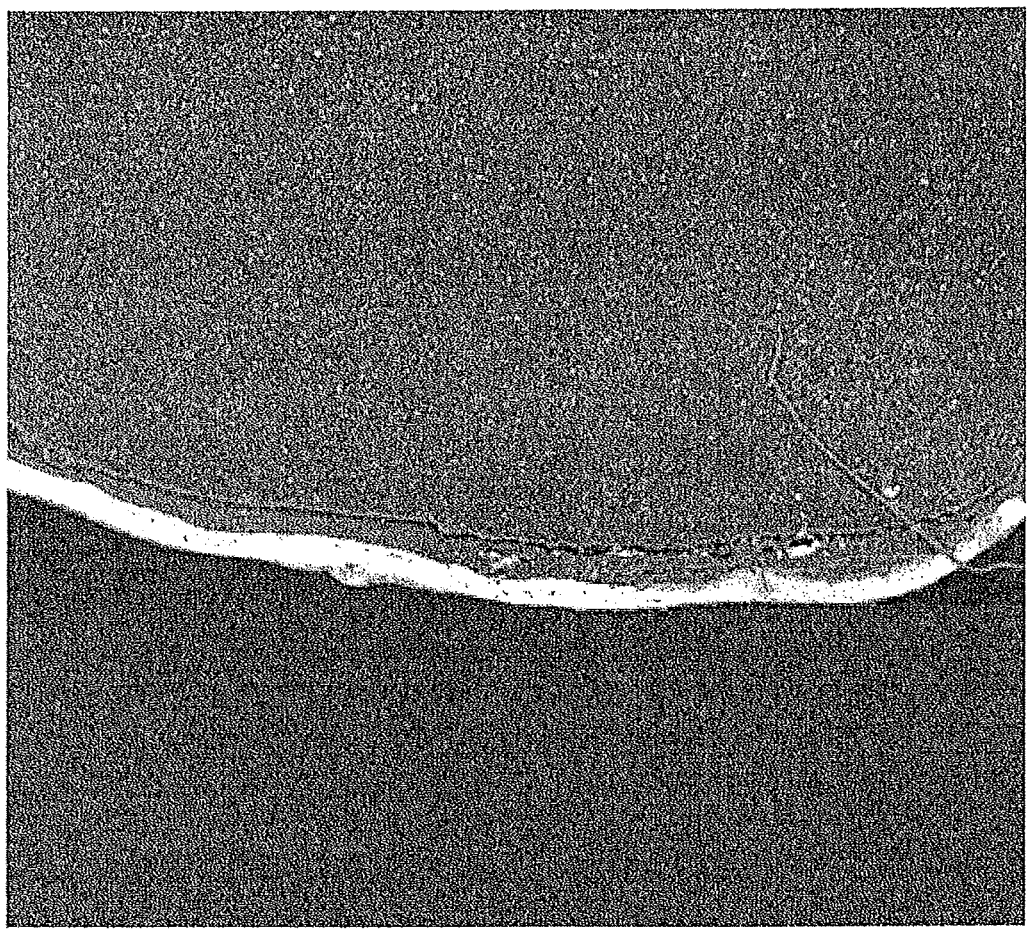
FIG. 10 is a scanning electron micrograph of a polymer-coated pellet.

The above coating process was scaled up to 5 kg scale using a Wurster fluid bed coater. In the 5 kg run, the primary coating layer was a higher viscosity ethyl cellulose (Ethocel™ 20 from Dow Chemical) which was plasticized with triethyl citrate and dissolved in a methanol/isopropanol solution. The final coated pellet included 6.6% ethyl cellulose and 18% PVDC top coat. Again, no loss of plastic PCM weight was observed after 5 cycles of heating to 60° C. and double-washing with hexane, indicating that there was no detectable paraffin seepage. Again, as with the 100 g coating experiment, SEM images confirmed complete coverage and two distinct coating layers. The micrograph showing the cross-section view of a sliced pellet is presented in FIG. 10 with 100× magnification. Each layer was about 30 to 70 micron thick.

DSC tests were run on a sample from the 5 kg coating run. The heat of fusion was 82 J/g. A sample obtained from the fluid-bed coater before all the PVDC coating was applied (10% PVDC top coat instead of 18%), had a heat of fusion (or latent heat storage) of 88 J/g.

Example 6

Flammability Test

The coated pellets from Example 4 (6% powder coating) and Example 5 (the 6.5% ethyl cellulose/18% PVDC coated sample) were subjected to a flammability test as described in this example. A tablespoon of the pellets placed on aluminum foil. A lit match was then placed on the pellets until they caught fire. The fire burning the PVDC-coated pellets self-extinguished after about 6 minutes. For the powder-coated pellets, the fire self-extinguished in about 7 minutes. In both cases, about half of the pellets were charred, while the other half was not burned. When uncoated pellets were subjected to the same test, the pellets continued to burn until nothing was left but a molten mass of plastic.

Example 7

Injection Molded Plastic PCM

About 10 lbs. of the PCM plastic compound of Example 4 was added to the feed hopper of a 165-ton Engel all-electric injection molding machine. A variable thickness plaque was used as the mold to simulate production of rectangular tiles. The plaque had dimensions of 2"×3". The thickness was varied during the trial to obtain plaques having 1 mm, 2 mm, and 3 mm thickness. The injection molding conditions included a nozzle temperature of 310° F., and zone temperatures of 250-280° F. Mold cavity and core were cooled with chilled water running at 55° F. Injection speed was 0.8 inch/sec with a hold pressure of 100 psi, 400 psi, and 450 psi, for the 1 mm, 2 mm, and 3 mm thick tiles, respectively. A cycle time of 21-25 sec was achieved. Samples of all three thicknesses were properly shaped in the form of the mold, and were strong, yet flexible. However, unlike the 2 mm and 3 mm samples, the 1 mm samples were partially warped (not straight on all sides).

Example 8

Extruded PCM Sheet

A 21 mm twin-screw co-rotating extruder with 36:1 length: diameter ratio was used to convert the powder-coated pellets of Example 4 into sheet form. The extruder was equipped with 6 heated zones and a film die (with 8-inch flex lip) and 3-roll take-up. The take-up was cooled with chilled water of approximately 50° F. temperature. The die gap was set at 2 mm.

After starting at 300° F., the extruder temperatures were modified to the following profile: Zone 1—290° F., Zone 2—290° F., Zone 3—290° F., Zone 4—250° F., Zone 5—250° F., Zone 6—250° F., Die—270° F.

The throughput through the exchanger was then adjusted to obtain a sheet thickness of approximately 2 mm. The sheet was easy to process and roll. The roll was shipped to the lab for DSC analysis, where it was unrolled easily as a long sheet. The DSC indicated a melting temperature of 24° C. and a solidification temperature of 23° C. The heat of fusion was measured as 104 kJ/m$^2$ (average of three measurements in the 97.3-111.2 kJ/m$^2$ range). For the PCM sheet product, or articles assembled therefrom, reporting latent heat storage capacity in units of energy per surface area (e.g., kJ/m$^2$) is considered more meaningful than energy per mass (e.g., kJ/kg).

Example 8

Performance of Plastic PCM in Buildings

The pellets produced in Example 2 were mixed with cellulose insulation and field tested at Oak Ridge National Laboratory's Natural Exposure Test Facility near Charleston, S.C. The wall panel included cavities for testing different insulations. Each cavity was instrumented with a heat flux transducer and various thermocouples. A 30 wt % blend of PCM pellets in cellulose insulation was put in one test cavity and the same insulation, without PCM was placed in the other. The wall was installed in the test building where internal temperature was controlled at 70° F. The data was collected continuously, generating daily performance datasets, showing differences in heat flux and temperature profiles across each wall cavity. Heat flux reductions of up to 42% and net heat gain reductions of up to 17% were observed for the PCM-enhanced insulation during hot summer days. The net heat gain was calculated by integrating the daily heat flux curves (i.e., measuring the area under the heat flux vs. time curves). The average summer reductions in peak heat flux and net heat gain were 33% and 12%, respectively. Whereas the reduction in peak heat flux is a measure of how much less peak load air conditioning would be used, the reduction in heat gain is an indication of the net reduction in energy consumption.

Many modifications of the exemplary embodiments of the inventions disclosed above, alone or in combination, will readily occur to those skilled in the art. Accordingly, the invention is to be construed as including all structure and methods that fall within the scope of the appended claims.

What is claimed:
1. A plastic phase change material (PCM) pellet comprising:
   a pellet comprising a mixture of a paraffin and a polymer; and
   two coating layers on the pellet comprising an inner coating and an outer coating,
      where at least one of the two coating layers is a flame retardant;
   wherein
      the paraffin is from about 50 wt % to about 90 wt % of the combined weight of paraffin and polymer;

the polymer is uncrosslinked high density polyethylene with a melt flow index between about 0.1 g/10 min and about 20 g/10 min; and the plastic PCM pellet has a latent heat falling in the range of about 60 J/g to about 160 J/g.

2. The plastic PCM pellet of claim 1 wherein the plastic PCM pellet size is 1 mm to 5 mm.

3. A fixed-bed module of the plastic PCM pellets of claim 1 comprising a rectangular or cylindrical chamber packed with the plastic PCM pellets.

4. The fixed-bed module of claim 3 wherein the chamber is of wire mesh screen construction.

5. The fixed-bed module of claim 3 wherein the chamber is of plastic construction.

6. The fixed-bed module of claim 5 wherein a thermal conductivity improver is added to the fixed-bed module of the plastic PCM pellets.

7. The fixed-bed module of claim 6 wherein the thermal conductivity improver is graphite or a metal powder.

8. An apparatus for reducing peak load air conditioning usage and energy consumption comprising a fixed-bed module of the plastic PCM pellets of claim 1.

9. An attic insulation system comprising the plastic PCM pellets of claim 1 and a blown insulation, wherein the plastic PCM pellets and the insulation are mixed and blown together, and wherein most of the plastic PCM pellets concentrate in the bottom half of the attic insulation system.

10. The plastic PCM pellet of claim 1 wherein the paraffin is from about 60 wt % to about 90 wt % of the combined weight of paraffin and polymer.

11. The plastic PCM pellet of claim 1 wherein the paraffin comprises a normal paraffin with a carbon number falling in the range of 14 carbons to 22 carbons.

12. The plastic PCM pellet of claim 1 wherein the two coating layers combined are from about 10 wt % to about 30 wt % of the total weight of the plastic PCM pellet.

13. The plastic PCM pellet of claim 1 wherein one of the two coating layers is an inorganic powder.

14. The plastic PCM pellet of claim 13 wherein the inorganic powder comprises calcium silicate, magnesium hydroxide, or fumed silica.

15. The plastic PCM pellet of claim 1 wherein one of the two coating layers comprises polyvinylidene chloride.

16. The plastic PCM pellet of claim 1 wherein the two coating layers are an inner ethyl cellulose coating and an outer polyvinylidine chloride coating.

17. The plastic PCM pellet of claim 16 wherein the inner ethyl cellulose coating is from about 2 wt % to about 7 wt % of the total weight of the plastic PCM pellet.

18. The plastic PCM pellet of claim 16 wherein the outer polyvinylidine chloride coating is from about 15 wt % to about 25 wt % of the total weight of the plastic PCM pellet.

19. The plastic PCM pellet of claim 16 wherein
the inner ethyl cellulose coating is from about 2 wt % to about 7 wt % of the total weight of the plastic PCM pellet; and
the outer polyvinylidine chloride coating is from about 15 wt % to about 25 wt % of the total weight of the plastic PCM pellet.

20. The plastic PCM pellet of claim 1 wherein each of the two coating layers has a thickness between about 10 microns and about 200 microns.

21. The plastic PCM pellet of claim 1 wherein each of the two coating layers has a thickness between about 30 microns and about 70 microns.

22. The plastic PCM pellet of claim 1 wherein the pellet further comprises fatty acids, fatty acid esters, fatty alcohols, sugar alcohols, or glycols.

23. The plastic PCM pellet of claim 1 wherein the pellet further comprises a flame retardant.

24. The plastic PCM pellet of claim 23 wherein the flame retardant comprises a halogenated organic compound, an organo-antimony compound, or an organo-phosphorous compound.

25. The plastic PCM pellet of claim 1 wherein the pellet further comprises a thermal conductivity improver.

26. The plastic PCM pellet of claim 1 wherein the thermal conductivity improver comprises graphite or a metal powder.

27. The plastic PCM pellet of claim 1 wherein the pellet further comprises an anti-oxidant.

28. The plastic PCM pellet of claim 1 wherein pellet further comprises
a flame retardant from about 10 wt % or less of the total plastic PCM pellet weight;
a thermal conductivity improver from about 2 wt % or less of the total plastic PCM pellet weight; and
an anti-oxidant from about 0.1 wt % or less of the total plastic PCM pellet weight.

29. The plastic PCM pellet of claim 1 wherein
the paraffin is from about 60 wt % to about 90 wt % of the combined weight of paraffin and polymer; and
the polymer is uncrosslinked high density polyethylene with a melt flow index between about 0.1 g/10 min and about 20 g/10 min.

30. The plastic PCM pellet of claim 1 wherein
the paraffin is from about 60 wt % to about 90 wt % of the combined weight of paraffin and polymer;
the polymer is uncrosslinked high density polyethylene with a melt flow index between about 0.1 g/10 min and about 20 g/10 min;
the two coating layers are an inner ethyl cellulose coating and an outer polyvinylidine chloride coating;
the inner ethyl cellulose coating is from about 2 wt % to about 7 wt % of the total weight of the plastic PCM pellet; and
the outer polyvinylidine chloride coating is from about 15 wt % to about 25 wt % of the total weight of the plastic PCM pellet.

31. The plastic PCM pellet of claim 1, wherein the outer coating layer is calcium silicate.

32. The plastic PCM pellet of claim 1, wherein the outer coating is a flame retardant.

33. The plastic PCM pellet of claim 1, wherein the mixture of the paraffin and the polymer is a homogenous mixture.

34. A plastic phase change material (PCM) pellet comprising
a pellet comprising a mixture of a paraffin and a polymer; and
two coating layers on the pellet comprising an inner coating and an outer coating;
wherein
the paraffin is from about 60 wt % to about 90 wt % of the combined weight of paraffin and polymer; and
the polymer is uncrosslinked high density polyethylene with a melt flow index between about 0.1 g/10 min and about 20 g/10 min;
the outer coating is a halogenated polymer; and
the plastic PCM pellet has a latent heat falling in the range of about 60 J/g to about 160 J/g.

35. The plastic PCM pellet of claim 34, wherein the mixture of the paraffin and the polymer is a homogenous mixture.

36. The plastic PCM pellet of claim 35, wherein
- the two coating layers are an inner ethyl cellulose coating and an outer polyvinylidine chloride coating;
- the inner ethyl cellulose coating is from about 2 wt % to about 7 wt % of the total weight of the plastic PCM pellet; and
- the outer polyvinylidine chloride coating is from about 15 wt % to about 25 wt % of the total weight of the plastic PCM pellet.

37. A plastic phase change material (PCM) pellet comprising
- a pellet comprising a mixture of a paraffin and a polymer; and
- two coating layers on the pellet comprising an inner coating and an outer calcium silicate coating;
- wherein
  - the paraffin is from about 60 wt % to about 90 wt % of the combined weight of paraffin and polymer;
  - the polymer is uncrosslinked high density polyethylene with a melt flow index between about 0.1 g/10 min and about 20 g/10 min; and
  - the plastic PCM pellet has a latent heat falling in the range of about 60 J/g to about 160 J/g.

38. A method for manufacturing the plastic phase change material (PCM) pellets of claim 1, comprising the steps of:
- (a) feeding an organic PCM and a polymer to an extruder to form a homogenous molten plastic compound;
- (b) extruding the molten plastic compound through a die to form an extrudate;
- (c) cooling and cutting the extrudate into pellets; and
- (d) coating the pellets.

39. The method of claim 38 wherein the paraffin comprises octadecane.

40. The method of claim 38 wherein the polymer is high-density polyethylene.

41. The method of claim 38 wherein the extruder is a twin-screw extruder.

42. The method of claim 38 wherein the cooling and cutting takes place in an underwater pelletizer.

43. The method of claim 38 wherein the coating step comprises blending the pellets with an oil-absorbing powder.

44. The method of claim 43 wherein the blending is performed in a V-blender.

45. The method of claim 43 wherein the oil-absorbing powder has an average particle size between 1 and 10 microns.

46. The method of claim 43 wherein the oil-absorbing powder is calcium silicate.

47. The method of claim 38 wherein the coating step comprises forming a polymer film on the pellet.

48. The method of claim 47 wherein the polymer film has a thickness between 20 microns and 200 microns.

49. The method of claim 47 wherein the polymer is polyvinylidene chloride.

50. The method of claim 47 wherein the polymer is ethyl cellulose.

51. The method of claim 47 wherein the coating step is performed in a fluidized bed spray coater.

52. The method of claim 50 wherein an ethylcellulose coating step is followed by a polyvinylidene chloride coating step.

53. The method of claim 38 wherein the plastic PCM pellets have a phase transition temperature between 10° C. and 34° C. and a corresponding latent heat between 80 J/g and 160 J/g.

54. The method of claim 38 wherein the feed to the extruder includes additives.

55. The method of claim 54 wherein the additives comprise a flame retardant, a nucleating agent, a thermal conductivity improver, a UV stabilizer, an anti-oxidant, or a color concentrate.

* * * * *